(12) United States Patent
Peterson et al.

(10) Patent No.: US 9,940,687 B2
(45) Date of Patent: Apr. 10, 2018

(54) DYNAMIC GRAPHICS RENDERING SCHEDULING

(71) Applicant: Imagination Technologies Limited, Kings Langley (GB)

(72) Inventors: Luke Tilman Peterson, San Francisco, CA (US); Ryan R. Salsbury, San Francisco, CA (US); Sean Matthew Gies, San Francisco, CA (US); Steven John Clohset, San Francisco, CA (US)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 14/709,635

(22) Filed: May 12, 2015

(65) Prior Publication Data

US 2015/0242990 A1 Aug. 27, 2015

Related U.S. Application Data

(63) Continuation of application No. 13/841,110, filed on Mar. 15, 2013, now Pat. No. 9,030,476, which is a continuation of application No. 12/771,408, filed on Apr. 30, 2010, now Pat. No. 8,674,987, which is a continuation-in-part of application No. 12/408,478, filed on Mar. 20, 2009, now Pat. No. 7,830,379, which is a continuation-in-part of application No.
(Continued)

(51) Int. Cl.
*G06T 15/06* (2011.01)
*G06T 1/20* (2006.01)
*G06T 15/00* (2011.01)
*G06T 1/60* (2006.01)

(52) U.S. Cl.
CPC ............ *G06T 1/20* (2013.01); *G06T 1/60* (2013.01); *G06T 15/005* (2013.01); *G06T 15/06* (2013.01)

(58) Field of Classification Search
None
See application file for complete search history.

(56) References Cited

U.S. PATENT DOCUMENTS

| 4,466,061 A | 8/1984 | Desantis et al. |
| 4,625,289 A | 11/1986 | Rockwood |

(Continued)

OTHER PUBLICATIONS

Ward, G., Simmons, M., The Holodeck Ray Cache: An Interactive Rendering System for Global Illumination in Nondiffuse Environments, Oct. 1999, ACM Transactions on Graphics, vol. 18, No. 4, pp. 361-398.*

(Continued)

*Primary Examiner* — Said Broome
(74) *Attorney, Agent, or Firm* — Vorys, Sater, Seymour and Pease LLP; Vincent M DeLuca

(57) ABSTRACT

Aspects can be for ray tracing of 3-D scenes, and include dynamically controlling a population of rays being stored in a memory, to keep the population within a target, a memory footprint or other resource usage specification. An example includes controlling the population by examining indicia associated with rays returning from intersection testing, to be shaded, the indicia correlated with behavior of shaders to be run for those rays, such that population control selects, or reorders rays for shading, to prioritize shading of rays whose shaders are expected to produce fewer rays.

20 Claims, 13 Drawing Sheets

Related U.S. Application Data

11/856,612, filed on Sep. 17, 2007, now Pat. No. 7,969,434.

(60) Provisional application No. 61/229,705, filed on Jul. 29, 2009, provisional application No. 61/229,258, filed on Jul. 28, 2009, provisional application No. 61/174,448, filed on Apr. 30, 2009, provisional application No. 61/095,890, filed on Sep. 10, 2008, provisional application No. 61/038,731, filed on Mar. 21, 2008, provisional application No. 60/826,201, filed on Sep. 19, 2006.

(56) References Cited

U.S. PATENT DOCUMENTS

| | | |
|---|---|---|
| 5,239,654 A | 8/1993 | Ing-Simmons et al. |
| 5,313,568 A | 5/1994 | Wallace |
| 5,933,146 A | 8/1999 | Wrigley |
| 5,973,699 A | 10/1999 | Kent |
| 6,023,279 A | 2/2000 | Sowizral et al. |
| 6,028,608 A | 2/2000 | Jenkins |
| 6,111,582 A | 8/2000 | Jenkins |
| 6,344,837 B1 | 2/2002 | Geisey |
| 6,489,955 B1 | 12/2002 | Newhall, Jr. |
| 6,556,200 B1 | 4/2003 | Pfister |
| 6,559,843 B1 | 5/2003 | Hsu |
| 6,633,296 B1* | 10/2003 | Laksono ............ G06F 3/14 345/502 |
| 6,731,304 B2 | 5/2004 | Sowizral et al. |
| 6,735,769 B1* | 5/2004 | Brenner ............ G06F 9/3836 711/133 |
| 7,009,608 B2 | 3/2006 | Pharr et al. |
| 7,012,604 B1 | 3/2006 | Christie et al. |
| 7,030,879 B1 | 4/2006 | Pharr |
| 7,071,938 B2 | 7/2006 | Herken |
| 7,098,907 B2 | 8/2006 | Houston et al. |
| 7,212,207 B2 | 5/2007 | Green |
| 2004/0249809 A1 | 12/2004 | Raman |
| 2005/0179686 A1* | 8/2005 | Christensen ......... G06T 15/06 345/423 |
| 2005/0264568 A1 | 12/2005 | Keller |
| 2006/0053189 A1 | 3/2006 | Mantor |
| 2006/0066607 A1* | 3/2006 | Schmittler ........... G06T 15/06 345/419 |
| 2006/0098009 A1 | 5/2006 | Zuniga |
| 2006/0139350 A1 | 6/2006 | Reshetov |
| 2007/0035545 A1 | 2/2007 | Hempel |
| 2007/0132754 A1 | 6/2007 | Reshetov et al. |
| 2008/0004421 A1 | 1/2008 | Chenault et al. |
| 2008/0024489 A1* | 1/2008 | Shearer ............... G06T 15/50 345/421 |
| 2008/0028154 A1 | 1/2008 | Hoover |
| 2008/0028403 A1 | 1/2008 | Hoover et al. |
| 2008/0049017 A1 | 2/2008 | Shearer |
| 2008/0074420 A1 | 3/2008 | Kuesel |
| 2008/0088622 A1 | 4/2008 | Shearer |
| 2008/0122841 A1 | 5/2008 | Brown |
| 2008/0122845 A1 | 5/2008 | Brown et al. |
| 2008/0129734 A1 | 6/2008 | Seung-Woo et al. |
| 2008/0150944 A1 | 6/2008 | Reshetov et al. |
| 2008/0180442 A1 | 7/2008 | Brown et al. |
| 2008/0211804 A1 | 9/2008 | Hempel et al. |
| 2009/0102844 A1 | 4/2009 | Deparis |
| 2009/0128562 A1 | 5/2009 | McCombe et al. |
| 2009/0183167 A1 | 7/2009 | Kupferschmidt et al. |
| 2009/0189898 A1 | 7/2009 | Dammertz et al. |
| 2010/0194751 A1 | 8/2010 | Wald et al. |

OTHER PUBLICATIONS

A. Augusto de Sousa and F. Nunes Ferreira, "A Scalable Implementation of an Interactive Increasing Realism Ray-Tracing Algorithm," Vector and Parallel Processing—VECPAR "96. Second International Conference on Vector and Parallel Processing—Systems and Applications. Selected Papers Springer-Verlag Berlin, Germany, 1997, pp. 458-469.

A J. van der Pioeg, "Interactive Ray Tracing, the replacement of rasterization?" B.Sc. thesis, VU University Amsterdam, The Netherlands, Dec. 2006. (Available at http://www.cs,vu.nil. aboutkielmannithesesiavdpioeg.pdf, last visted on Mar. 31, 2008.).

Budge Out-of-core Data Management for Path Tracing on Hybrid Resources Eurographics vol. 28, No. 2 (2009).

C. Benthin, I. Wald, M. Scherbaurr and H. Fnedrich,Ray Tracing on the Cell PrOCeSSOC IEEE Symposium on interactive Ray Tracing 2006, Sep. 18-20, 2006 pp. 15-23, Salt Lake City, UT.

Carsten Benthin, PhD thesis: "Realtime Ray Tracing on Current CPU Architectures," Saarland University, Saarbrucken, Germany, Jan. 2006. (Available at graphics.cs.tilli-sly.del.about.benthinfphd. pdt, last visited on an. 7, 2008.

Christian Lauterbach, Sung-Eui Yoon, David Tuft and Dinesh Manocha, "RT-DEFORM Interactive Ray Tracing of Dynamic Scenes using BVHs," In Proceedings of the 2006 IEEE Symposium on Interactive Ray Tracing, Salt Lake City, UT, Sep. 18-20, 2006.

David R. Chapman, "High Definition Interactive Animated Ray Tracing on CELL Processor using Coherent Grid Traversal" Class final project paper, CMSC 635: Advanced Computer Graphics, Computer Science and Electrical Engineering, University of Maryland, Baltimore County, Baltimore, MD {Available online at http..// www_csee..urnbc.edul.about.olano1635s07Idchaprri2.pdf, last visited Oct. 30, 2009.

DeMarie, D E., Gribble, C P & Parker, S. G. (Jun. 2004). Memory—Savvy Distributed Interactive Ray Tracing. In EGPGV (pp. 93-100).

DeMarie, David E., et al. Memory sharing for interactive ray tracing on clusters, Parallel Computing 31.2 (2005); pp. 221-242.

B Grolier and W. Purgathofer, "Coherence in Computer Graphics," Institute for Computer Graphics . . . Technical _ University Vienna, Vienna, Austria, Trans on Information and Communication Technologies, vol. 5, 1993 WIT Press.

E. Mansson, J. Munkberg and T. Akenine-Moller, Deep Coherent Ray Tracing, RT- 07—Symiposiurn on Interactive Ray Tracing 2007, Sep. 10-12, 2007, pp. 79-85. (Available at: httpligraphics.cs. lth.seiresearchlpapers120071deepconldeepcoherent.pdf, last visited Jan. 7, 2003.).

Eric Haines, "Ray Tracing News: Light Makes Right" [Online], vol. 2, No. 8, Oct. 27, 1989, Retrieved from the Internet: URL:httplitog/ acm.orgiresourcesiRTNewalhtmlirtneWs9a.html> [retrieved on Oct. 26, 2009].

Eric Haines, Ray Tracing News: "Light Makes Right," vol. 12, No. 2, Dec. 21, 1999. Retrieved from the Internet: http//tog/acm.org/ resources/RTNews/htrril/rtnewa9a.html> [retrieved on Mar. 10, 2008.

Eric Haines, Ray Tracing News: Light Makes Right, vol. 3, No. 1, Jan. 2, 1990. Retrieved from the Internet: URL: http:lllog.aGM. orgiresources1RINewsihtmlirtnv3n1..html [retrieved on Jul. 28, 2009.

Eric Lafortune, "Mathematical Models and Monte Carlo Algorithms for Physically Biased Rendering," Ph. D. thesis, Department of Computer Science, Faculty of Engineering, Kathoileke Universiteit Leuven, Feb. 1996.

Eric Larsen, Stefan Gottschalk, Ming C. Lin, and Dinesh ManOcha, "Fast Distance Queries with Rectangular Swept Sphere Volumes," Proceedings of IEEE International Conference on Robotics and Automation, San Francisco, CA, 2000, vol. 4, pp. 3719-3726.

G. Humphreys and C.S Ananian,"TigerSHARK: A Hardware Accelerated Ray-Tracing Engine," Technical report, Princeton University, Princeton, NJ, May 14, 1996. (Available at citese.ersiSt. pstieduiartideihumphreys96tigershark.html, last visited on Jan. 7, 2008.

Geoff Wyvill, "Practical Ray Tracing," Computer Graphics International 1995, Tutorial notes.

H. Du, M. Sanchez-Eiez, N. Tabrizi, N. Baghetzadeh, M.L. Anido and M. Fernandez, "Interactive. Ray Tracing on Reconfig D urahie SIM MorphoSys," Proceedings of the Design, Automation and Test in Europe Conference and Exhibiton, 2003. Asia and South Pacific Jan. 21-24, 2003, pp. 471-476.

(56) References Cited

OTHER PUBLICATIONS

H. Friedrich, J. Gunther, A. Dietrich, M. Scherhaum, H-P Seidel and P. Slusallek, Exploring the Use of Ray Tracing for Future Games, Proceedings of the 2006 ACM SIGGRAPH symposium on Videogame.s , BoSton, MA, pp. 41-50, 20Q6.

Hank Weghorst, Gary Hooper and Donald P. Greenberg, "Improved Computational Methods for Ray Tracing," ACM Transactions on Graphics . ((TOG), Jan. 1984, vol. 3, issue 1, pp. 52-69.

Horiguchi, S., Katahira, M., Nakada, T., Parallel processing of incremental ray tracing on a shared-memory multiprocessor, 1993, The Visual Computer, vol. 9, No. 7, pp. 371-360.

I. Wald and P. Slusailek, "State of the Art in Interactive Ray Tracing," In State of the Art Reports, EUROGRAPHICS 2001; pp. 21-42, 2001.

I. Wald, C. Gribble, S. Boulos and A. Kensler, "SIMD Ray Stream Tracing—SIMD Ray Traversal with Generalized Ray Packets and On-the-fly Re-Ordering," SCI Institute Technical Report No. 11IJSC1-2007-012, 2007.

I. Wald, P. Slusaliek and C. Benthin, "Interactive Distributed Ray Tracing of Highly Complex Models," Rendering Techniques 2001—Proceedings of the 12th ELJR0PGRAPHICS Workshop on Render, pp. 274-285, London, England, Jun. 2001.

I, Wald P. Slusaliek, C. Benthin and M. Wagner, Interactive Rendering with Coherent Ray Tracing, . . . flouter Graphics Forurn, Proceedings of EUROGRAPHICS 2001, vol. 20, No. 3, 2001.

J. Fender and J. Rose, "A High-Speed Ray Tracing Engine Built on a Field-Programmable System," Proceedings of the 2003 IEEE International Conference on Field-Programmable Technology (FPT), Dec. 15-17, 2003, pp. 188-195.

J. Hanika and A. Keller, Towards Hardware Ray Tracing using Fixed Point Arithmetic, IEEE/EG Symposium on Interactive Ray Tracing, 2007, Sep. 10-12, 2007, Ulm, Germany, pp. 119-128.

J.G.Cleary,B.M. Wyvil, G.M. Birtwistie and R. Vatli "Multiprocessor Ray tracing," Computer Graphic Forum, vol. 5,. issue 1, pp. 3-12, 1986.

James Bigler, Abe Stephens and Steven G Parker "Design for Parallel Interactive Ray Tracing Systems," Proceedings of the IEEE Symposium on InteractiveRay Tracing, 2006, pp. 187-196.

Jorg Schmittler, Ingo Wald, and Philipp Slusallek, SaarCOR—A Hardware Architecture for Ray Tracing, Proceedings of the ACM SIGGRAPH/EUROGRAPHICS conference on Graphics hardware. Saarbrucken. Germany. Session: Ray tracing vs. scan conversion, pp. 27-36, 2002.

M. Pharr, C Kolb, R. Gershbein and P. Hanrahan, "Rendering Complex Scenes with Memory-Coherent Ray" Tracing, in Computer Graphics, vol. 31, pp. 101-108, Aug. 1999 , ACM Siggraph 1997 Conference Proceedings.

Martin Christen, "Ray Tracing on CPU," Master's thesis, Univ. of Applied Sciences Basel (F HBB),,Jan. 19, 2005 {Available online at httpligpurt.sourceforge.netiDA07.sub.-0405,sub.- Ray,sub,-Tracing.sub.-on.sub.-CPU-1,0,5.pdf, last visited Dec. 10, 2009.

Masataka Ohta and Mamoru Maakawa, Ray-bound tracing for perfect and efficient anti-aliasing, The Visual Computer: International Journal of Computer Graphics. vol. 6, issue 3, Springer Berlin I Heidelberg, May 1990 pp. 125-133.

P A. Navratil, D S. Fussell, C. Lin and AF R Mark, Dynamic Ray Scheduling to Improve Ray Coherence and Bandwidth Utilization, IEEE Symposium on Interactive Ray Tracing, 2007, Sep. 10-12, 2007. pp. 95-104.

Reinhard, Erik, Alan Chalmers, and Frederik W. Jansen. "Hybrid scheduling for parallel rendering using coherent my tasks." Proceedings of the 1999 IEEE symposium on Parallel visualization and graphics. IEEE Computer Society, 1999.

Reinhard, Erik, and Frederik W. Jansen. "Rendering large scenes using parallel ray tracing." Parallel Computing 23.7 (1994) 873-885.

Roni Yagel and John Meeker, "Priority-driven Ray Tracing," The Journal of Visualization and Computer Animation, vol. 8, No. 1, pp. 17-32, Jan. 1, 1997.

Spjut "TRaX: A Multi-Threaded Architecture for Real-Time Ray Tracing" Application Specific Processors, 2008. SASP 2008. pp. 108-114.

Sugerman, GRAMPS: A Programming Model for Graphics Pipelines , ACM Transactions on Graphics, vol. 28, No. 1, Article 4, Publication date. Jan. 2009.

Sven Woop, Jorg Schmittler and Philipp Slusaleig, "RPU: A Programmable Ray Processing Unit for Realtime Ray Tracing," ACM Transactions on Graphics (TOG), vol. 24, Issue 3, (Jul. 2005), Proceedings of ACM SIC-3 GRAPH 2005,session: Hardware rendering, pp. 434-444, 2005.

Tsakok,J, A. (Aug. 2009) Faster incoherent rays: Multi-BVH ray stream tracing. In Proceedings of the Conference on High Performance Graphics 2009 (pp. 151-158) ACM.

\* cited by examiner

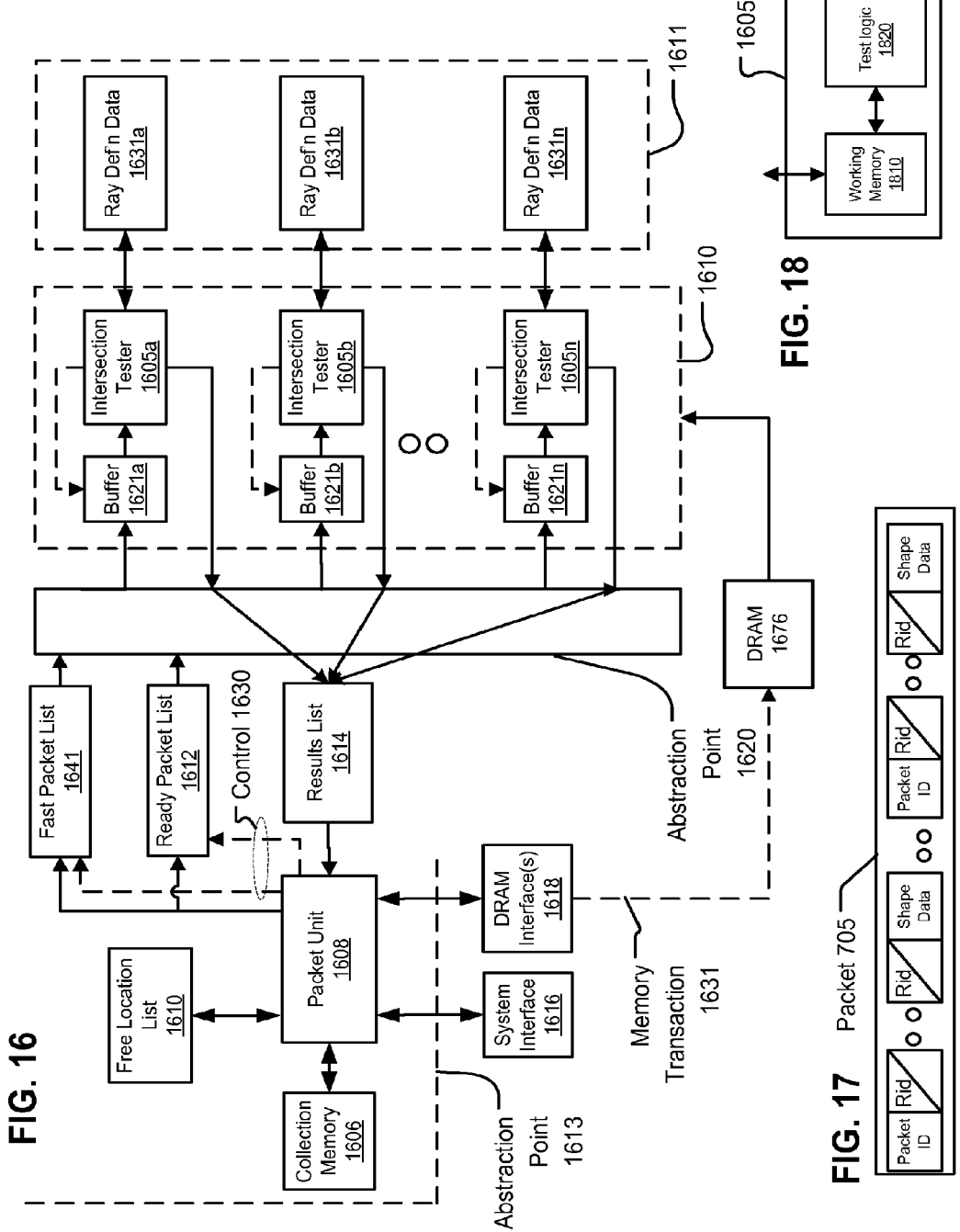

DYNAMIC GRAPHICS RENDERING SCHEDULING

CROSS REFERENCE TO RELATED APPLICATIONS

This application is a continuation of Ser. No. 12/771,408, filed on Apr. 30, 2010, which is a continuation-in-part of U.S. patent application Ser. No. 12/408,478, filed on Mar. 20, 2009, which is a continuation-in-part of U.S. patent application Ser. No. 11/856,612, which was filed on Sep. 17, 2007, and claims priority from and incorporates U.S. provisional application No. 60/826,201, entitled "Ray Tracing Enhancements for Graphical Rendering", filed on Sep. 19, 2006; U.S. patent application Ser. No. 12/408,478 also claims priority from U.S. provisional application No. 61/038,731, entitled "Coupling Ray Storage and Compute for Memory-Efficient Ray Intersection Test Scaling", filed on Mar. 21, 2008, and from U.S. provisional application No. 61/095,890, entitled "Architectures for Parallelized Intersection Testing and Shading for Ray-Tracing Rendering", filed on Sep. 10, 2008; this application also claims priority from provisional app. No. 61/174,448 filed on Apr. 30, 2009, entitled "Dynamic Ray Population Control", and from provisional app. No. 61/229,258, filed on Jul. 28, 2009 and from provisional app. No. 61/229,705, filed on Jul. 29, 2009, both entitled "Ray Tracing System Architectures and Methods"; and all applications referenced above are incorporated by reference in their entirety, for all purposes, herein.

BACKGROUND

Field

In some aspects, the following relates to rendering, using ray tracing, two-dimensional representations of three-dimensional scenes composed of shapes.

Related Art

Rendering photo-realistic 2-D images from 3-D scene descriptions with ray tracing is well-known in the computer graphics arts. Ray tracing usually involves obtaining a scene description composed of geometric shapes, which describe surfaces of structures in the scene, and can be called primitives. A common primitive shape is a triangle. Objects can be composed of one or more such primitives.

The primitives can be associated with textures and other information that instructs a computer how light hitting that primitive should be affected by qualities of the primitive. In other words, a model of a physical environment is produced; the model may be designed to produce realistic results for conditions familiar to humans, or the model may be designed to achieve other results as desired. Ray tracing can produce such photo-realistic images, including realistic shadow and lighting effects, because ray tracing can model the physical behavior of light interacting with elements of a scene. However, ray tracing is also known to be computationally intensive, and at present, even a state of the art graphics workstation requires a substantial amount of time to render a complicated scene using ray tracing, and real-time high quality and resolution rendering with ray tracing is still difficult to achieve.

Generalizing, rendering a scene with ray tracing involves intersection testing a ray (specified by any of a number of processes) to identify a closest primitive intersected by the ray. Computer code and data are often associated with primitives, and such code and data can be called a shader for a particular primitive. Determining a closest primitive intersected for the ray causes the shader for the intersected primitive to run. The shader consumes memory and compute resources during execution, and can, among other actions, instantiate new rays to be intersection tested. The rays instantiated by the shader can be for different purposes. For example, some rays can be instantiated by a call to get diffuse lighting conditions at the intersection point, other rays can be instantiated to determine whether other primitives shadow the intersection point, still other rays can be instantiated based on materials properties such as subsurface scattering, reflection and refraction. Thus, the shading of one primitive intersection can cause generation of a number of rays that also must be intersection tested. Shader code may also perform a variety of other processing based on information obtained from intersection testing of rays that it emitted. Therefore, a shader that emitted rays to be intersection tested may need to remain resident in a memory, or otherwise occupy or consume processing resources while intersection testing of those rays completes.

For example, a method that can be used during scene rendering can involve receiving intersection testing results in temporal order, where these intersection testing results indicate intersections that may be shaded. Typically, each intersection testing result comprises an indication of a ray and an indication of primitive. These indications are reordered, from the temporal order in which the intersection testing results were received, so that their order of shading also is affected. The new order is determined by selectively prioritizing shading of intersection testing results whose indicated rays are associated with importance information indicating that their shading would emit fewer rays than rays from other intersection testing results available for shading. This method can be employed in a memory constrained condition.

A complex scene can have hundreds of thousands, or even millions of primitives. Therefore, intersection testing of rays can be computationally expensive, even with various methodologies for accelerating or otherwise increasing the efficiency of that intersection testing (e.g., using an acceleration structure hierarchy, such as a k-d tree).

Further approaches for managing the computational loads of shading and intersection testing remain desirable, in order to further the usage of ray tracing in fields such as rendering of 3-D scenes into 2-D representations.

BRIEF DESCRIPTION OF THE DRAWINGS

FIG. 16 depicts further details of an example architecture for providing ray tracing functionality in a system, in which packets of ray/shape information (formed from collections) can be used in controlling intersection testing;

FIG. 17 depicts an example of a multiple packet format, in which packets can be grouped into a master packet; and FIG. 18 depicts aspects of a test cell, which is an example of intersection testing resource, which can be implemented as a thread, a core, a process, or a CPU, by example.

SUMMARY

Figure 1:
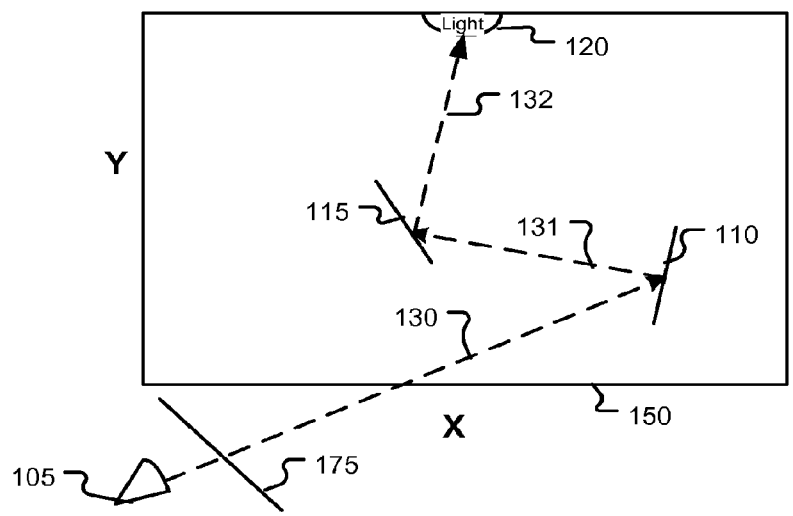
FIG. 1 depicts a simplistic toy scene with a camera emitting rays that are intersection tested, and such intersections cause shaders to execute, emitting further rays for intersection testing.

Two principal components of rendering using ray tracing is intersection testing of rays (virtual rays of light) and the shading of intersections identified by intersection testing. The rays that are intersection tested can be produced by program code modules (shaders) that describe how materials and other characteristics of a scene affect the rays. Such shaders can be associated with particular scene primitives describing scene objects (e.g., a wireframe for a face can include primitives associated with a skin shader). Some shaders emit more rays than other shaders. How many rays a given shader emits can depend both on characteristics of the ray that caused the shader to run by intersecting a primitive associated with the shader, and on the shader itself. Many millions of rays need to be tested and shaded during higher quality scene renderings. However, if too many shaders that emit a comparatively large number of rays are run within too short of a timeframe during rendering, then rendering resources can be choked.

Thus, in one aspect, the following concerns modulating a total number of rays being stored during a scene rendering by selecting (prioritizing) shader of certain ray/primitive intersections. In some aspects, the selecting includes selecting ray intersections that are likely to result in fewer rays emitted during shading at rendering times when there are constraints in rendering resources, such as memory constraints.

For example, a given ray is generally stored in memory until it completes intersection testing, and any shaders associated with an intersection for that ray are run. Thus, if there is insufficient space to allow shaders to emit rays for storage, thus allowing rays that have completed intersection testing to be removed from memory, a deadlock condition can result in which completed rays cannot be finished, nor can new rays be emitted. Dynamic ray population control features described herein can modulate how rays are produced during shading to temporarily defer shading of ray intersections that can be determined (heuristically or by other means) more likely to cause comparatively more rays to be emitted.

For example, a method of ray tracing rendering comprises storing data defining rays for intersection testing in a 3-D scene composed of primitives. The method also comprises maintaining respective weighting factors for the rays and maintaining a ray population metric for the rays. The method comprises testing a selection of the rays for intersection and the testing results in a number of indications of intersections between rays and primitives. The method comprises accessing an indicator for a target stored ray population, and selecting intersections of rays and primitives for shading based on respective ray weighting factors, if there is a surplus of stored rays or a memory constraint condition (or both).

A surplus of stored rays can be detected based on memory resource availability or usage metrics, for example. The surplus can be detected by comparing a target stored ray population with a ray population metric. Statistics relating to the ray weighting factors can be maintained and used in the selecting. For example, the selecting can include selecting weighting factors less than an average or median during a surplus of stored rays. Ranges and/or levels, such as quantizations, for such metrics and targets can be provided.

Heuristics relating to shader behavior can be loaded, created, and maintained. Such heuristics can be used in methods and systems according to these aspects and examples. Such heuristics can be based on information provided with shader code, such as hint information. Such heuristics can involve statistical information about rays, weighting factors, and so on. Such heuristics can be derived by execution of shader code modules, such execution can be done on a trial basis, to determine whether results of such execution should be committed or scrapped.

In system aspects, a computing resource for testing rays for intersection and another computer resource for shading identified intersections can be provided. A queue can connect the intersection testing resource and the shading resource. Ray population control can be implemented based on what ray intersections are shaded from that queue. Such determinations can be based on information associated with the ray, and which can be available from the queue. Systems can read an intersection from the queue, and if a decision is to defer shading for that intersection, the intersection can be placed at a back of a queue. A number of queues can be provided, and ray intersections can be binned among the plurality of queues based on weighting factor, and a determination to read from a particular queue can be made on heuristics such as seeking to track a ray population metric to a target ray population. A target for ray population can be based on a variety of system characteristics, and other considerations. For example, considerations can include a desired memory footprint for ray storage, and a desired memory footprint in a particular type of memory (e.g., faster cache memory). The target can be expressed as a range of values. The target also can be count a number of rays, an amount of data for storing the rays, and can be expressed as an indicator derived from such information. For example, a target percentage of memory usage can serve as an indicator. A variety of other data also can be used to express or quantify such targets, metrics, and other system status and configuration information.

Systems can have memory systems in which ray data is stored in multiple memory levels that have various combinations of attributes, such as speed, size, cost, and latency. Decisions, heuristics, goals and the like can be maintained based on components of such memory systems. Such memory systems may comprise queues implemented as any of a first in first out queue, a ring buffer, a linked list, and a list sorted by weighting factors associated with the rays.

Other aspects comprise a computer readable medium comprising stored computer executable code and data implementing an application programming interface (API) semantic for interfacing a ray tracing rendering system with shaders to be executed in response to intersections identified between rays and primitives during scene rendering. The API semantic comprises one or more calls for accepting new rays from the shaders to be intersection tested in the scene. The instructions implementing the API semantic may comprise instructions for accepting data from a shader that is associated with a ray emitted by the shader, and which can be used for estimating a number of rays that may be emitted during shading of a to-be-identified intersection of that ray and a to-be-identified primitive.

Another aspect includes a computer readable medium comprising stored computer executable code and data implementing a compiler for preparing to render a 2-D representation of a 3-D scene. The compiler is to parse modules of shader code that respectively are to be associated with scene primitives. The shader code modules are capable of using an application programming interface (API) semantic to provide a hint concerning a number of new rays that would be emitted by the shader when executed. The hint is provided with the compiled shader modules and is to be used during scene render in determinations to defer the execution of shader code modules whose hints indicate that they may emit a larger than average number of rays and performance metrics indicate a constraint in ray memory storage capacity.

Various other aspects comprise a system that allows shaders to emit new rays to be intersection tested, and rays from one or more such shaders can be ordered for intersection testing, based on heuristics such as seeking to track a ray population metric to a target ray population metric. Thus, rays can be prioritized for intersection testing based on what shaders that will be identified based on to-be-detected intersections can be expected or predicted to do.

Examples of information that can be used as inputs into the selection and prioritization aspects disclosed can include any one or more of the following: (1) weighting factors for rays that intersected primitives associated with the shader code modules, (2) hints provided with the shader code modules or with the rays (or both), (3) information derived during profiling of the shader code modules, (4) information obtained by allowing trial execution of the shader code modules and (5) shader cost information, which can be produced by a compiler preparing for scene rendering.

Any of these exemplary systems and methods can be implemented with instructions and/or data provided on a computer readable medium.

Means for implementing the functions described thus can include one or more computing resources, such as processor cores, threads, groups of processors, graphics cards, fixed function cores, FPGAs, ASICs and so on, programmed in accordance with performance of that example function or an equivalent thereto.

DETAILED DESCRIPTION

The following description is presented to enable a person of ordinary skill in the art to make and use various aspects of the inventions. Descriptions of specific techniques, implementations and applications are provided only as examples. Various modifications to the examples described herein may be apparent to those skilled in the art, and the general principles defined herein may be applied to other examples and applications without departing from the scope of the invention.

For clarity in description, data for a certain type of object, e.g., a primitive (e.g., coordinates for three vertices of a triangle) usually is described simply as the object itself, rather than referring to the data for the object. For example, when referring to "a ray", it is to be understood that data representative of that ray is referenced, as well as the concept of the ray in the scene.

FIG. 1 illustrates a simplified scene setup, in which a 2-D plane 175 is disposed between a camera 105 and a scene 150, comprising objects 110, 115 and a light 120. A camera ray 130 is emitted from camera 105 (such using program code descriptive of behaviors of the camera). It is determined through intersection testing that ray 130 intersects object 110. A ray 131 is emitted by a shader (e.g., program code and data describing behavior for an object or surface) associated with object 110. For example, object 110 may have a mirrored surface, and as such the shader for it would generate ray 131 to test reflection at an angle that ray 130 was incident on object 110. It then is determined that ray 131 hits object 115. For simplicity, a shader associated with object 115 is shown to have similar behavior to that of the shader for object 110, emitting a ray 132 to test whether light is incident on object 115 at an angle that could have traveled on the path of ray 131. Ray 132 is determined to intersect light 120.

The example of FIG. 1 was necessarily grossly simplified. Many factors adding computational cost to a more realistic ray tracing scene include that the resolution of the 2-D representation to be rendered can be high, such as a full HD resolution of 1920×1080 pixels (over 2 million pixels). Each pixel of the scene can have many rays emitted from the camera that are associated with it. Thus, rendering such a scene can involve initially testing many millions of camera rays alone, followed by much higher numbers of rays that are emitted by shaders identified based on object intersections with camera rays, and in turn rays subsequently emitted by shaders.

Shaders can involve substantial computation and emission of further rays that test various conditions. For example, shaders can perform diffuse lighting tests, such as Monte Carlo diffuse lighting, which involves emission of a number of rays to test ambient lighting conditions. Shaders may emit rays to test whether an intersection point is shadowed by another object for known light sources in the scene. Shaders also can model complex materials characteristics, such as subsurface scattering for skin, reflection, refraction, and so on. Each of these functions can involve emission of rays that need to be intersection tested in the scene. Thus, rendering a full HD high resolution 2-D representation of a complex scene can involve intersection testing of hundreds of millions or more rays.

Thus, for purposes herein, this example shows that a ray is tested for intersection in a scene. If it is found to intersect an object (e.g., a primitive), then a shader associated with that object can be identified and executed. That shader can in turn emit more rays to be intersection tested. The number and type of rays that shader emits typically depends both on characteristics of the intersecting ray and also on the effects that the shader is implementing.

With so many rays needing intersection testing, not all rays can be intersection tested concurrently. Also, considering the rendering of a scene progressing from start to finish, at any given time, not all rays that need to be traced to complete the rendering have been defined, since events during scene rendering progress affect the definition of such rays.

Another concern is that some shaders will generate a large number of rays that will consume a large amount or percentage of available intersection testing resources. For example, a shader for camera 105 initially would emit camera rays to be traced in the scene (e.g., ray 130). That camera shader may emit many millions of rays. Each of these rays also would be more likely to cause further generation of rays than some other types of rays, such as shadow rays or diffuse lighting rays, such that a million camera rays can directly result in emission of tens of millions of rays to be emitted by shaders that are run based on camera ray intersections. Memory storage for these rays can be exhausted quickly. As explained below with specific examples, dynamically controlling the population of rays, and in some cases controlling their population diversity (explained herein) helps further rendering completion.

The nature and extent of what is encompassed within dynamic ray population control can be understood from the following explanation and the claims appended hereto.

Figure 2:
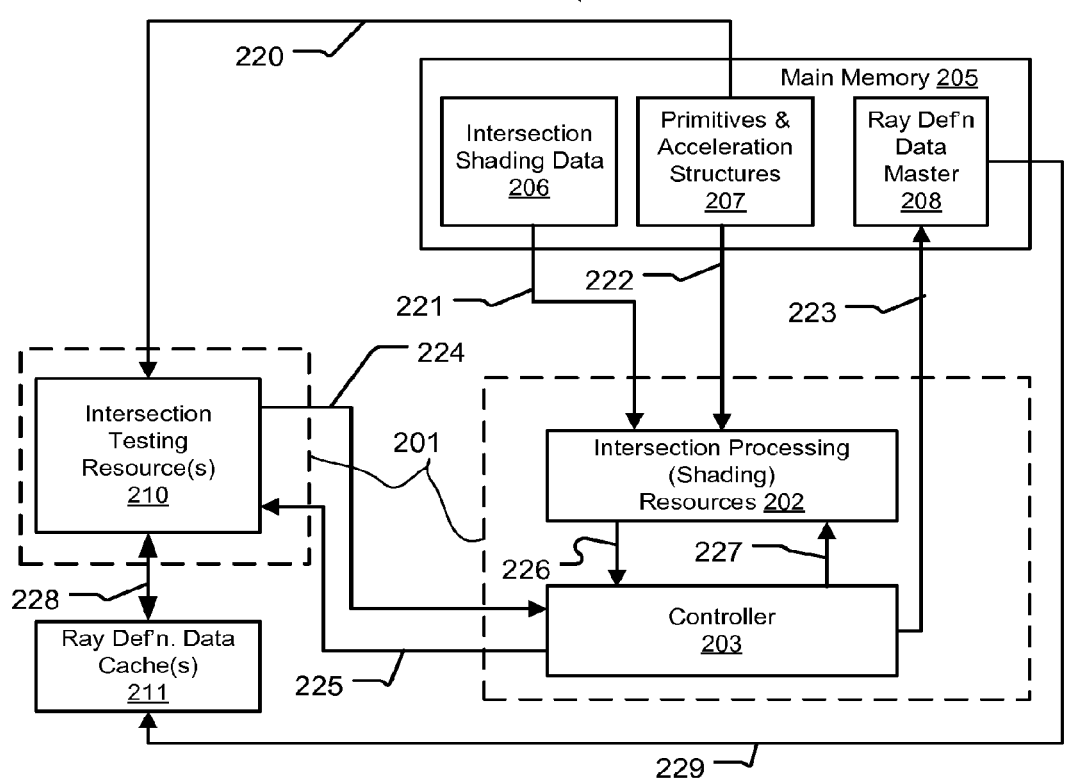
FIG. 2 depicts an example system in which an intersection testing resource, a computation resource for executing shaders, and control functional is provided for rendering scenes with ray tracing.

FIG. 2 illustrates an example system 200 for use in rendering a scene with ray tracing. System 200 comprises a main memory 205, in which is stored data 206 for intersection shading (e.g., shader code, textures, procedural geometry, and so on), primitives and acceleration shape elements (e.g., triangles, triangle strips, vertexes, bounding spheres, axis aligned bounding box or k-d tree definitions, and so on), and a master copy of data 208 defining the rays currently being tested for intersection in the scene. The main memory 205 communicates with an intersection processing resource 202, in which shaders for identified ray/primitive intersections can be run. The communication between memory 205 and intersection processing resource 202 is shown to include link 221 for providing intersection shading data 206 from memory 205, and link 222 for providing primitive data from memory 205.

The intersection processing resource 202 operates to shade intersections identified by an intersection testing resource 210. Intersection testing resource 210 is directed to test rays by a controller 203. Controller 203 provides indications of rays to be tested to intersection testing resource 210 via a link 225; preferably controller 203 indicates rays to be tested by providing an identifier, which can be related to a memory location storing data defining that ray resident in cache 211. In that preferred situation, definition data for the rays to be tested is obtained/received via link 228 from ray definition cache 211. Intermediate testing results of a current closest detected primitive intersection can be stored with ray definition data in cache 211 (i.e., in some implementations, rays can intersect primitives, but if the rays are not tested in an order that the ray traverses the scene, then a farther intersection can be detected prior to a real, closest intersection, which is the only intersection of interest).

Closest possible detected intersections (if any) are indicated via a link 224 to controller 203 (e.g., if a ray did not intersect any scene object that ray may or may not be indicated through link 224). Intersection testing resource 210 receives primitive and acceleration shape data from memory 205 through link 220.

Controller 203 arranges for processing of these closest indicated intersections in intersection processing resources 202. Controller 203 receives data defining rays to be intersection tested that have been created by the shaders executing on resources 202. In FIG. 2, link 226 is depicted for receiving such new ray data, while link 227 is depicted for providing information to instantiate shading of a particular intersection that was provided from link 224. Link 227 can comprise providing, or fetching code and data defining a shader, or otherwise directing intersection processing resources to perform such fetching from memory 205.

Controller 203 also manages the master copy of ray definition data 208 stored in memory 205, and can store data defining new rays in memory 205 via link 223. Data stored in memory 205 defining rays that have completed intersection testing are replaced by data defining new rays instantiated by the shaders.

The intersection testing resources 210 and the intersection processing resources 202 can be implemented on a processing platform 201 and can comprise threads of processing on a multithreaded processor, or threads executing on separate cores of a multiple core processor, or physically separate processors, each potentially with multiple cores. Each thread can execute instructions from computer executable code obtained from memory 205 or from another source. Similarly, memory 205 may be implemented as dynamic RAM accessible through a memory controller (not separately depicted) by processor 201. Cache 211 may be implemented in various levels, such as a private or semi-private L1 cache owned by one or more cores in a multiple core processor, L2 caches and L3 that may be shared among cores and/or among processors. Preferably, ray definition data stored in cache 211 is protected from being overwritten by normal cache management algorithms, such as Least Recently Used, and the like. Instead, it is preferred that controller 203 manage the ray definition data stored in cache 211, as a subset of the ray definition data master 208. Such ray definition data in cache 211 can be updated from master 208 via link 229.

The links 220-229 illustrated may be implemented based on the implementation of the cache 211, memory 205, and the intersection testing 210 and processing 210 resources.

Generally, intersection testing resource 210 performs more fixed-function types of computation, in that it tests rays for intersection against shapes, usually either a primitive shape or an acceleration shape element, which bounds a selection of primitives defining the scene. By contrast, the types of computation to be performed during shading (on the intersection processing resource 202) are more general, in that shaders can perform a variety of computation, access, manipulate and create various data, and so on. Therefore, in some circumstances, intersection testing resources 210 can be implemented beneficially with more fixed-function processing, while resources 202 can often be implemented beneficially on a more general purpose computing platform. Therefore, in some circumstances, intersection testing resources 210 can be provided as an acceleration function, add-in card, co-processor, or the like that either is fixed-function or can be programmed with the expectation that the programming will not change often during the rendering of a scene.

Implementations according to this disclosure need not have all characteristics shown in example system 200. For example, in system 200, rays are indicated for intersection testing by providing ray identifiers, separate from data defining the rays to intersection testing resource 210, which is optional. By further example, various links where illustrated, but depending on the implementation, not all such links may be necessary or desired. Instead, FIG. 2 depicts a system wherein computation resources can be provided for intersection testing, and they therefore produce indications of detected intersections. These intersection testing resources can operate concurrently with computation resources that are executing shaders for detected intersections. The shaders emit new rays for intersection testing, which are taken up for testing by the intersection testing resources.

Also it is desirable in systems according to these disclosures to produce large numbers of rays for intersection testing. It also is desirable in these systems to have a wide variety of rays available for intersection testing, or otherwise being intersection tested concurrently. For example, it can be desirable to have a mixture of camera rays, and rays emitted by a variety of different shaders all being intersected tested concurrently. For example, it can be preferable to have a wide diversity of rays originating from different locations in a 3-D scene, and going in a wide variety of different directions.

However, in practical implementations, there are a limited amount of processing resources that can be allocated for intersection testing and ray storage (this is so even if there is no precise upper bound on numbers of rays that can be processed or stored, for example, but rather the consideration can include time-based concerns such as average rendering time for a scene being within a certain budget, and the like). Assuming a high quality scene rendering and a complex scene, there generally will be more rays to test than resources to concurrently test or store them.

By particular example, it may be undesirable to run out of memory space for ray storage. However, a ray is generally stored in memory until it completes intersection testing, and any shaders associated with an intersection for that ray are run. Thus, if there is insufficient space to allow shaders to emit rays for storage, thus allowing rays that have completed intersection testing to be removed from memory, a deadlock condition can result in which completed rays cannot be finished, nor can new rays be emitted. In some cases, e.g., FIG. 15, systems can be provided that allow paging of ray data into larger, slower memories, and the various dynamic ray population control features described herein can account for that paging capability.

One approach would be to completely execute a camera ray shader, and test all rays that it emits for intersection, then run all shaders identified based on camera ray intersections, dispose of all camera rays, test all rays emitted by those shaders for intersection, run all identified shaders, dispose of those rays, and say on. This approach can be referred to as a ray generation-by-generation ray population control technique. Although it may indeed limit ray population, it does not allow for advantages of ray intersection testing and shading provided by ray tracing architectures as described herein.

One problem existing in accelerating ray tracing is that a database describing all the primitives of a complex scene is quite large, such as more than 100 megabytes, and far larger than a size of fast cache memories. However, a sequence in which portions of that database need to be accessed to test all the rays that need to be tested has been found extremely difficult to predict, such that normal caching approaches have been found ineffective in ray tracing, as those caches thrash. One approach that ties in with the generation-by-generation population control is to attempt to explicitly identify rays that would be less likely to thrash a cache of scene data. One such approach is to identify rays that have a similar or the same origin, and a similar direction, and test those rays as a packet. This technique and its variants are known as packet tracing.

For example, in packet tracing, a group of camera rays of similar origin and direction may be tested together. Camera rays may have some inherent similarity, as they usually are directed in a similar direction and have similar origins. However, attempting to identify such rays after several generations of scattering in a scene, in order to form ray packets, is difficult, and can involve substantial computation.

Thus, one advantage not available in a system organized to perform generation-by-generation ray population control approach is found by an approach that can be contrasted with what is known as packet tracing. By contrast with packet tracing, which attempts to identify rays of similar origin and direction, a preferred architecture herein is an architecture that explicitly provides for and encourages a wide diversity of ray types, with many different origins and directions to be available for intersection testing at any given time. As such, what is desirable in this architecture is a dynamic ray population control approach, in which ray population is more granularly controlled. The following disclosure relates to examples of how such granular control can be implemented.

Figure 3:
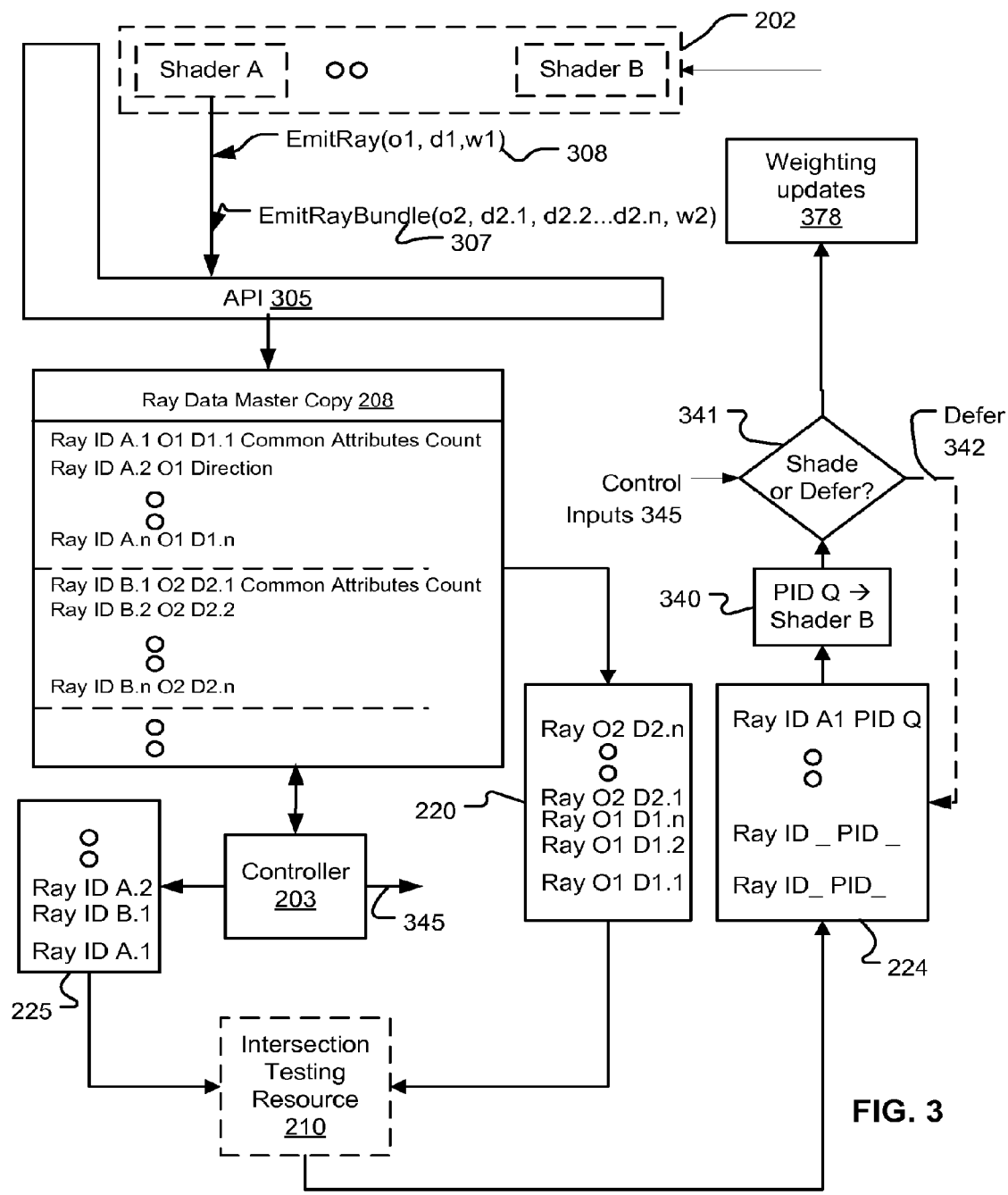
FIG. 3 depicts a data flow view wherein shaders can use an API for interfacing with a system according to FIG. 2, and implementing functions according to examples herein.

FIG. 3 illustrates an overall architectural view in which portions of system 200 are depicted, and in which a dynamic ray population control function can be provided. Intersection processing (shading) resources 202 are depicted as executing a plurality of shaders. Each shader can emit new rays using one or more function calls, two of which are exemplified as an EmitRay call 308 and an EmitRayBundle call 307, respectively which allow one and a plurality of rays to be emitted by a shader for intersection testing. An API 305 provides code that is executed in response to these calls, and which intakes the data provided and processes it appropriately. One result of such processing that ray data master copy 208 stores new rays that were emitted using the EmitRay 308 and EmitRayBundle call 307.

Controller 203 communicates with the memory storing ray data master copy 208, and causes a plurality of ray identifiers for rays that are to begin intersection testing to be stored in a queue that implements link 225. Intersection testing resource 210 inputs those ray identifiers and receives, via link 220, which also is depicted as having a queue, ray definitional data from master copy 208. Intersection testing resource 210 outputs indications of detected intersections via link 224, which has a queue. A function 340 maps each primitive identified by the indications in the queue with an associated shader (e.g., illustrated is that primitive ID Q maps to Shader B). A decision 341 to run shader B, or defer its execution is made using data made available through control inputs 345. If the decision is to shade, then that shader is readied for execution using intersection processing resources 202, and if the decision is to defer, then the indication comprising the ray identifier A1 and primitive identifier Q can be put back into the queue of link 224. In an example, the indication can be put at the back of the queue, while in other examples, it can simply be skipped over, in that a current indication pointer can be maintained, as well.

In an example, each ray can be associated with a weighting factor (e.g., a weight) and control inputs 345 can comprise a threshold weight at which a shade/defer decision is to be made. For example, shade/defer decision 341 can be executed such that if a weighting factor is less than the threshold, the decision is to shade, while if the weighting factor is equal to or greater, then the decision is to defer. In addition to the decision to shade or defer, maintenance 378 can be done for the controls based on the weighting factors of the rays that have been shaded. For example, the threshold can be related to a moving average of the rays that have been shaded. In such a case, that moving average would be updated based on the weight associated with ray A1.

Figure 4:
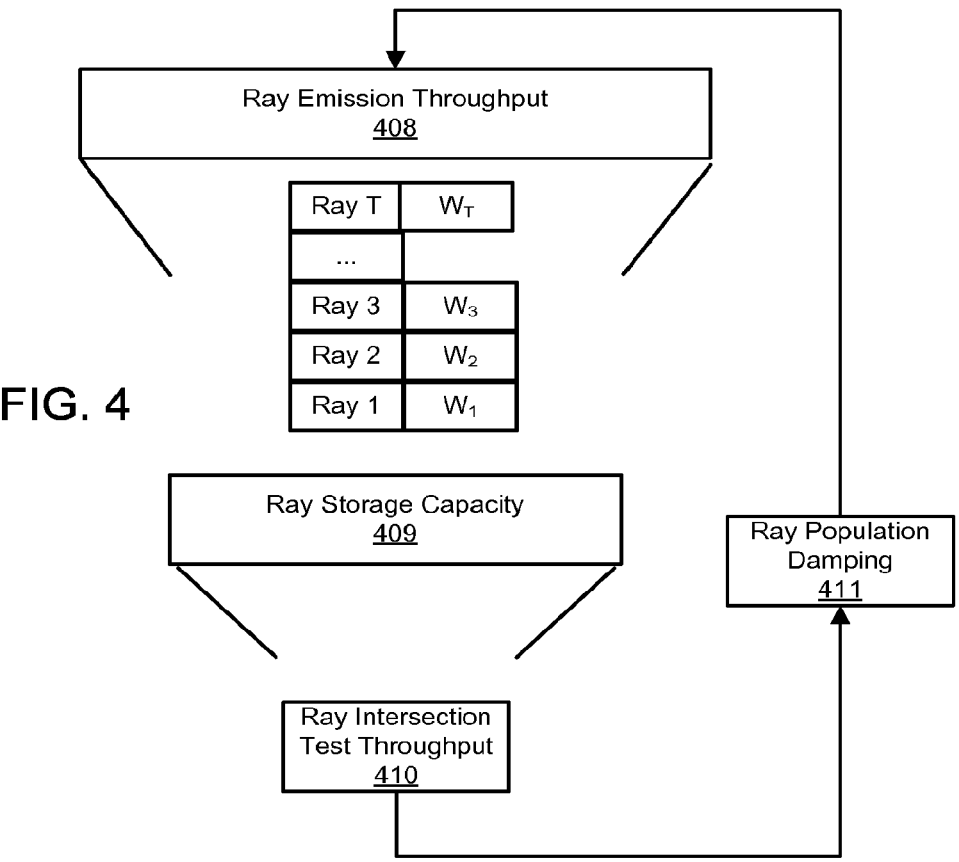
FIG. 4 depicts a high-level approach to dynamic ray population control.

FIG. 4 illustrates a conceptual view concerning ray population control that can apply in a variety of systems. First, a ray emission throughput 408 is depicted, and a number of rays, each associated with a weighting factor are produced. The rays are produced for storage in a memory that has a ray storage capacity 409. The rays are then intersection tested in an intersection testing resource having a throughput 410. The relatively smaller width of the ray intersection test throughput 410 box compared with the ray emission throughput box 408 indicates that rays can be generated for testing faster than rays can be tested. Ray storage capacity 409 therefore is intended to buffer that gap. However, in typical systems, even ray storage capacity 409 may not be sufficiently large to avoid overruns, unless a ray population damping control 411 is implemented. The ray population damping control 411 implements a negative feedback that suppresses ray emission to be less than a maximum possible throughput.

Figure 5:
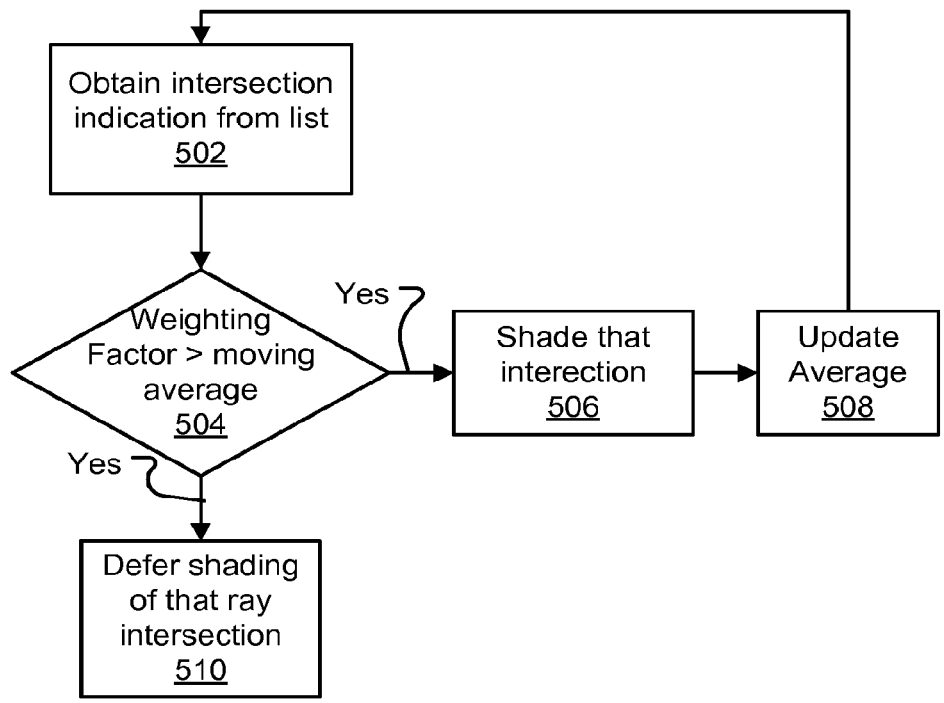
FIG. 5 depicts an example method for implementing dynamic ray population control.

FIG. 5 illustrates steps of an example method of implementing ray population damping 411. As described above, an output of intersection testing is a ray intersection indication, and such an indication is obtained (502). The indication identifies a ray and an intersected object (e.g., a primitive). The ray, as shown in FIG. 4, is associated with a weighting factor. Thus, the weighting factor associated with the ray identified in the indication is compared with a moving average of weights of rays that have been shaded. For example, a moving average can include all rays that have been shaded, the last thousand rays, the last 100,000 rays, and the like. If the weighting factor is greater than the moving average (comparison 504), then that intersection is deferred (510), and if it is not, then that intersection is shaded (506), the average updated (508).

As would be apparent, one approach to implementing a system that provides a dynamic ray population control function is to associate a weighting factor with rays. After the ray has been identified as intersecting an object for which a shader is to be run, then it can be determined whether or not to run that shader, and potentially create new rays. Thus, for such weighting factor to be useful in ray population control, it should have predictive value as to what the shader for the primitive is likely to do. One way in which these weighting factors can have such predictive value is by enforcing relative sizes of the weighting factors as follows. When rays are first emitted for testing, they generally would be assigned relatively high weights, when an intersection is identified such a ray, a shader is run that produces a number of new rays. The shader should enforce an approach that emits rays with weights appropriate for its purposes. For example, a diffuse lighting test would emit a large number of rays with rays of comparatively lower weights than the camera ray. However, a mirror reflection may emit only one or a few rays, and these rays would have weights more similar to the camera ray weight.

When the diffuse lighting rays are tested for intersection, and found to intersect, shaders identified by that intersection are less likely to be provoke further ray emissions than the mirror reflection ray, and instead could simply cause light energy to be contributed to a pixel buffer. Therefore, if the goal is to bring down over time a population of rays stored in memory waiting to be intersection tested, one way to accomplish that goal is to select rays that have comparatively low ray weights for shading, and defer rays that have comparatively higher weights, which when shaded would cause more rays to be emitted.

Figure 6:
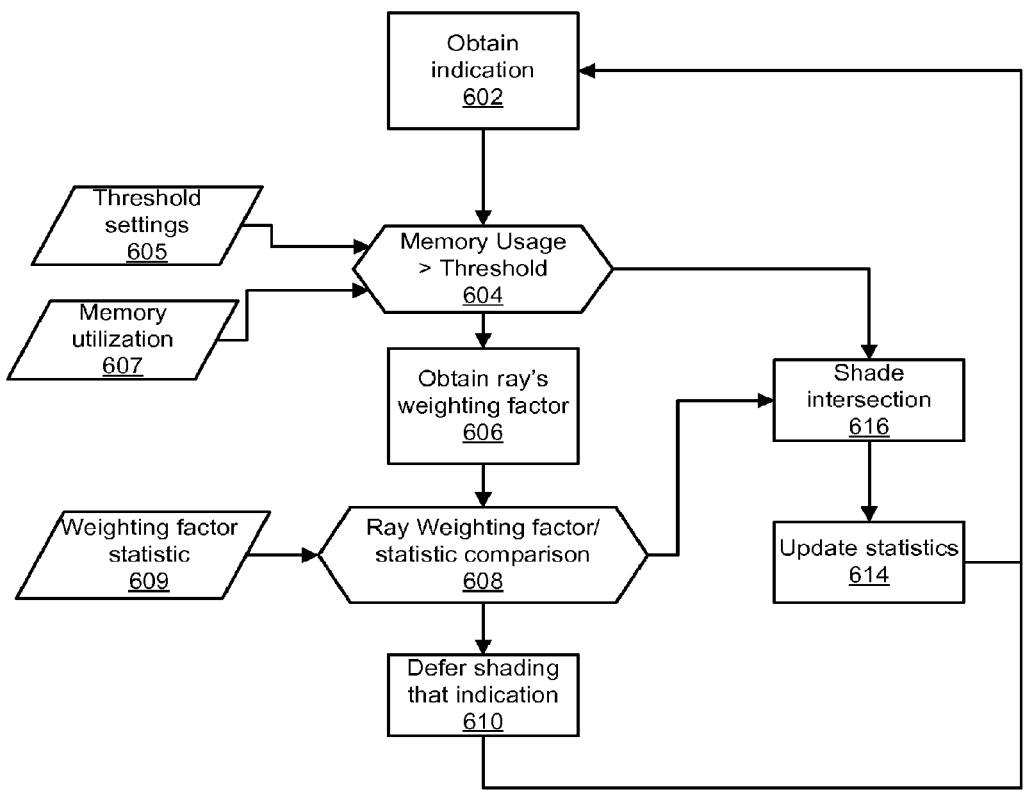
FIG. 6 depicts aspects of a second approach to dynamic ray population control.

FIG. 6 illustrates a method with further features that include an ability to switch a population control function on and off, depending on status information, such as an amount of ray memory used.

FIG. 6 depicts obtaining (602) a ray intersection indication. A memory usage statistic is compared with a threshold, and if the usage statistic is greater than that threshold (or greater than or equal, if desired), then a population control mode is entered. In that mode, a weighting factor for the indicated ray is obtained (606) and compared with a weighting average statistic obtained from source 609. Examples of such statistics can include a moving average. Further examples can include a median, as well as standard deviation information. For example, standard deviation information can be maintained such that if the memory usage is much greater than a threshold, then the comparison implemented in 608 can include requiring that a weight associated with a given ray be more than one standard deviation less than the average. More generally, any statistic that can be used to estimate a distribution of weights of the rays can be used to implement a dynamic ray population control mode that can vary in its operation according to such statistical distributions.

By further explanation, providing a ray population control function that has varying degrees of control can allow a smoother operating system that is less likely to oscillate between extremes. For example, in a loose population control mode, rays that are less than a medium or average can be allowed to shade, while in a stricter control mode, rays with weights that are at least 20%, 25%, 30% or another selectable number less than average may be selected, and so on. As can be discerned, any degree of granularity that is desired can be implemented in a system.

The method of FIG. 6 continues that if the intersection is determined to be shaded, it is shaded (616), and the statistics are updated (614). Otherwise, shading is deferred (610), and in either case, another indication is obtained.

FIG. 6 also illustrates that other data than can be used or made available in determining whether to enter a population control mode includes memory utilization information 607 and threshold setting information 605. For example, threshold setting information 605 may comprise parameters that are tuned for different size memories. For example, different systems may have a different balance between an amount of ray memory storage and throughput of intersection testing and new ray emission during shading. In systems that have lower ratios of memory to ray emission capability, ray population control parameters may need to be more aggressive.

Also, although statistics can be maintained based on the rays that were shaded, other implementations are possible. For example, statistics can be maintained after ray emission from shadings being run, before those new rays have been intersection tested.

Figure 7:
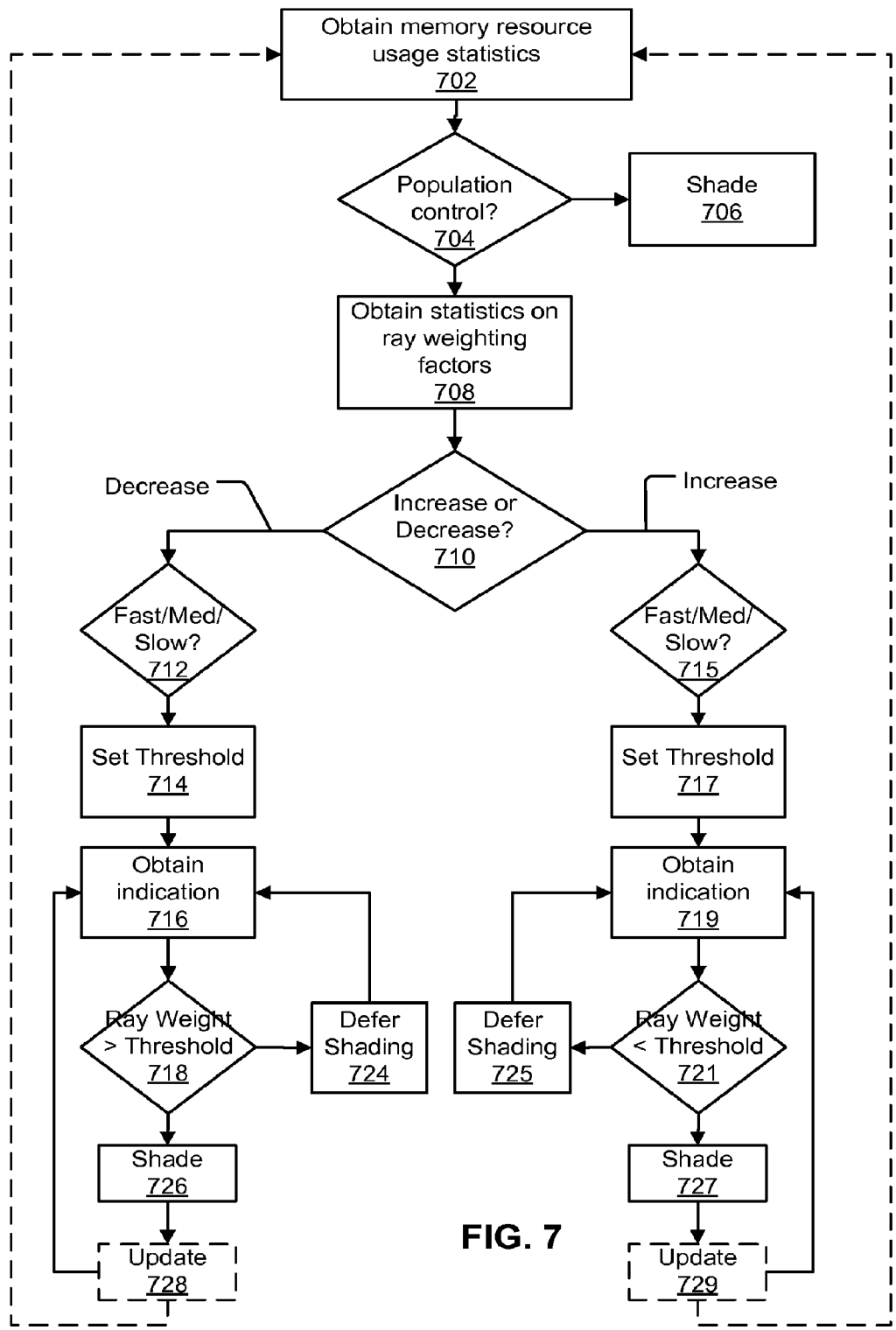
FIG. 7 depicts method aspects for a further dynamic ray population control example.

FIG. 7 illustrates an extension to a basic implementation involving damping a ray population, in that a ray population also can be controlled to stay within a desired range, as follows. FIG. 7 illustrates that memory resource usage statistics can be obtained (702), and from those statistics, a determination to enter a population control mode 704 can be made. If the decision is negative, then shading of available intersection indications can continue (706). If the decision is positive, then statistics on ray weighting factors can be obtained (708). A decision to increase or decrease the ray population is made (710). If the decision is to increase, a further decision to determine a degree of change to implement can be made (715) and conversely to decrease proceeds to (712). Each of 712 and 715 can include fast, medium and slow settings for example. Based on that determination, respective thresholds can be set (714 and 717). An indication can be obtained (716 and 719), and a weight for that indication can be checked against the set threshold at decision points 718 and 721. In the case of the decrease mode (including step 712), a finding that the ray weight is greater than the threshold results in shading deferral (724), while on the increase side, a decision that the ray weight is less than the threshold results in deferral (725). Otherwise, the intersection is shaded (respectively, 726 and 727), and statistics can be updated (respectively, 728 and 729). Further indications can then be obtained in either mode, (returning respectively to steps 716 and 719). At times, the method can return to obtain updated memory resource usage statistics, illustrated by returning dashed lines to 702. This return can be periodic, for example.

In several examples above, a shade/defer decision was made based on comparing a weight with a threshold. In various examples, the threshold could be arrived at simply by an averaging, or could be distillation of a wide variety of factors, inputs, and other parameters. Other implementations can provide the threshold as a range, thus accounting for both a discrete decision to enter population control, as well as whether it is desired to increase or decrease a number of rays. Ranges can be specified to accomplish either goal by specifying ranges that are greater than an average or medium (increasing a number of rays in flight), or less than those statistics (decreasing the number). As described above, the range can be open ended on one end. Such thresholding information also can be specified as approximations, and the thresholds or ranges need not be defined exactly.

Also, the above examples generally showed architectures that involve obtaining rays from a source, and determining, in some cases, sequentially, whether or not to shade each indication. However, implementations of these disclosures are in no way limited to such examples.

Figure 8:
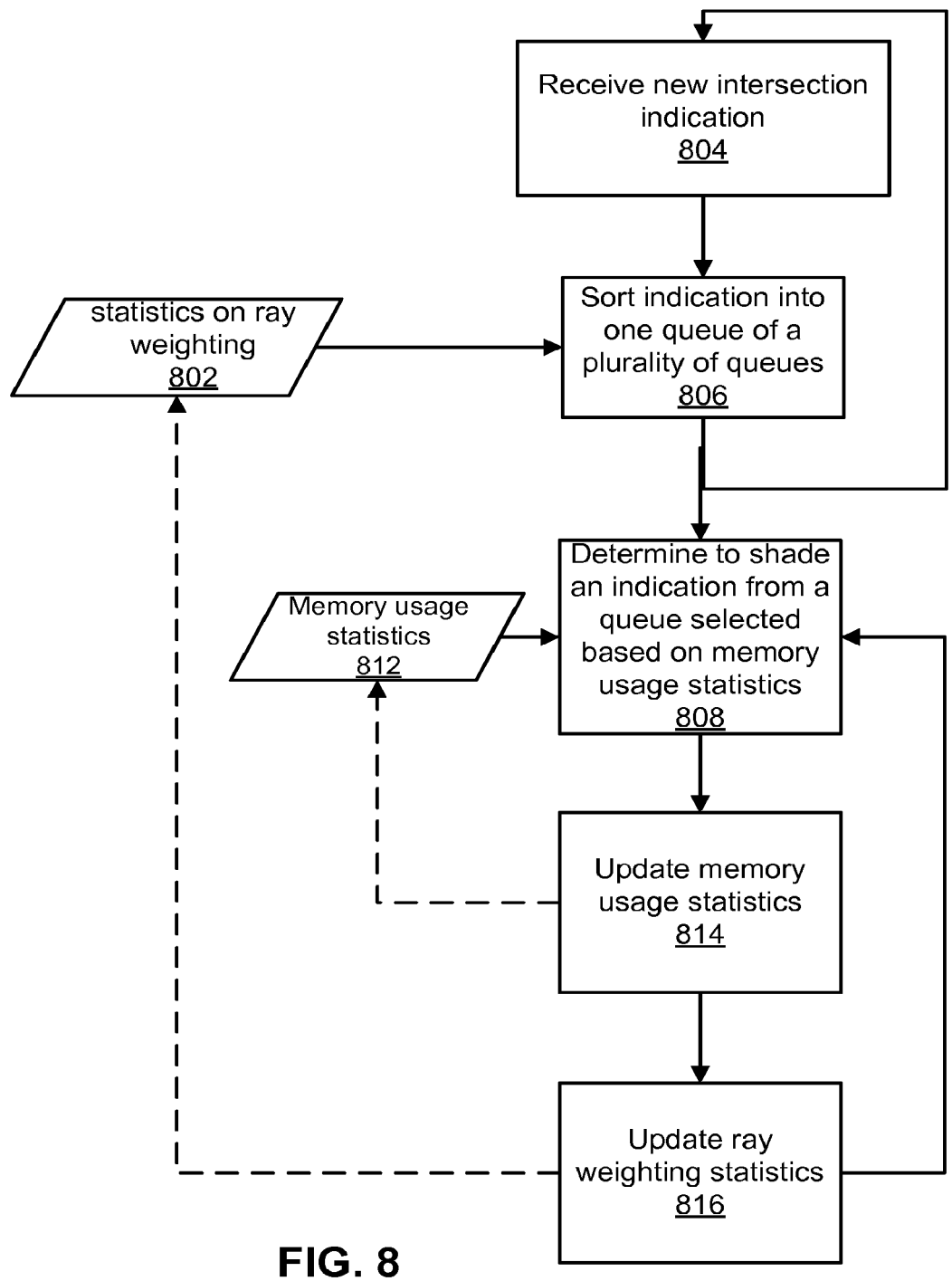
FIG. 8 depicts method aspects for an approach to dynamic ray population control involving pre-sorting rays before shading.

For example, FIG. 8 illustrates an example where new rays are received from a camera shader and/or other shaders. Weights associated with the new rays are accessed to sort each of the rays into one queue of a plurality of queues. Such sorting can use statistics on ray weighting (802). For example, three queues can be provided, such that rays with weights up to a certain number are put into the low queue, a middle range of weights go in the middle queue, and the rest go in the high queue. Then, a determination as to which queue to pull a subsequent indication from for testing is determined (808) based on memory usage statistics (12). Updating of the memory usage statistics (814) and also those of the ray weighting statistics (816) can be accomplished. The method can loop to obtain another indication from one of the queues.

Figure 9:
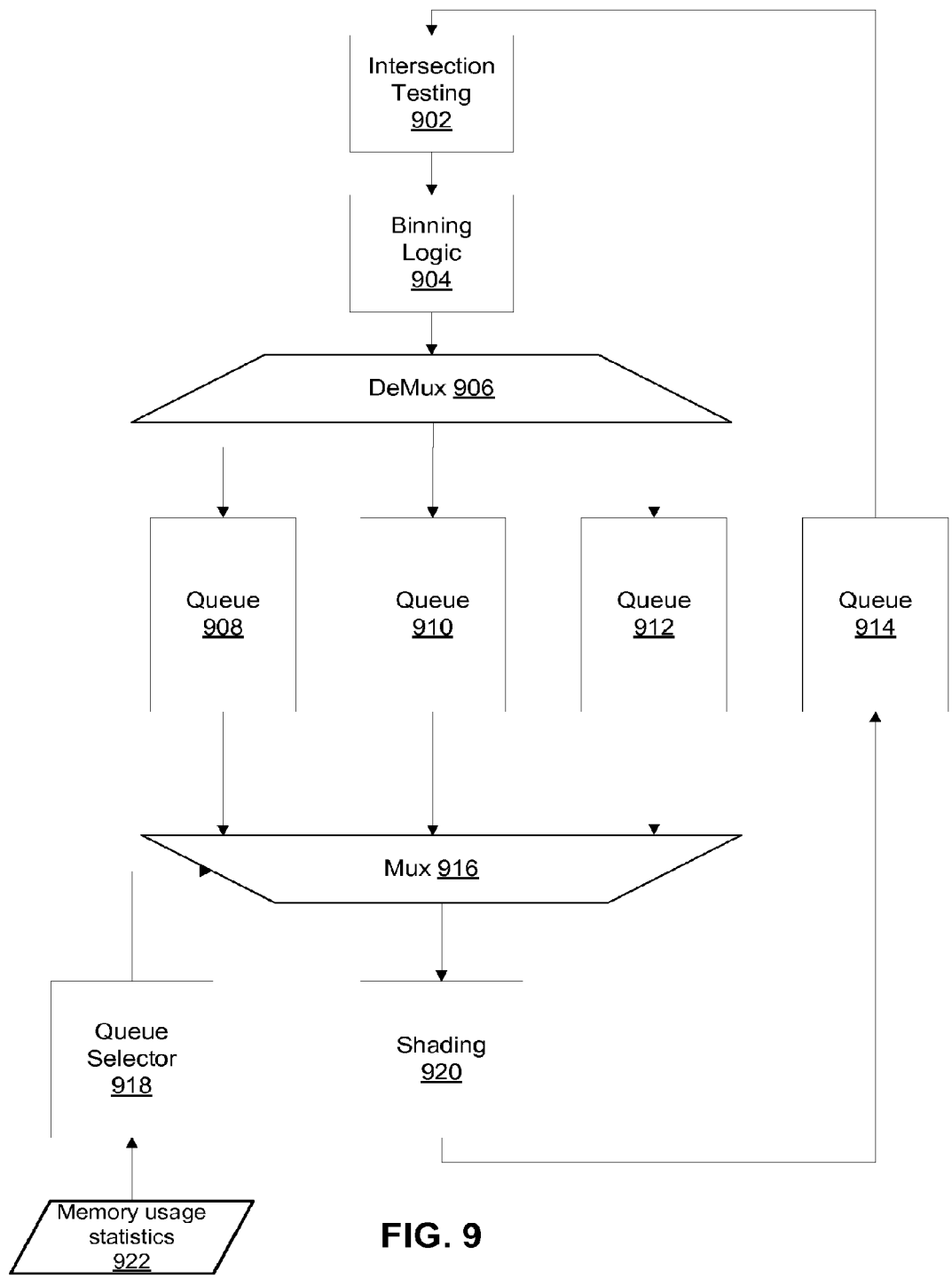
FIG. 9 depicts a system view in which the method aspects of FIG. 8 can be implemented.

FIG. 9 illustrates a system that can be used to implement the method of FIG. 8. In FIG. 9, there is depicted an intersection testing resource 902 that outputs indications to binning logic 904. The binning logic splits the indications into one of three queues 908, 910, and 912. A mux 916 is connected to the outputs of queues 908, 910, and 912. A selection is made by queue selector 918 as to which queue should be read to obtain an indication to shade next. Queue selector 918 uses memory usage statistics in making such a determination. The output of mux 916 is coupled with shader resources 920, which is in turn coupled with a queue 914 that receives new rays emitted during shading. An output of queue 914 feeds into intersection testing 902.

The above examples generally illustrated that ray population control can be implemented at a point where ray intersections are identified and awaiting shading. Although this approach is convenient, in that control of the population can be more directly effected, it is not an exclusive approach.

Figure 13:
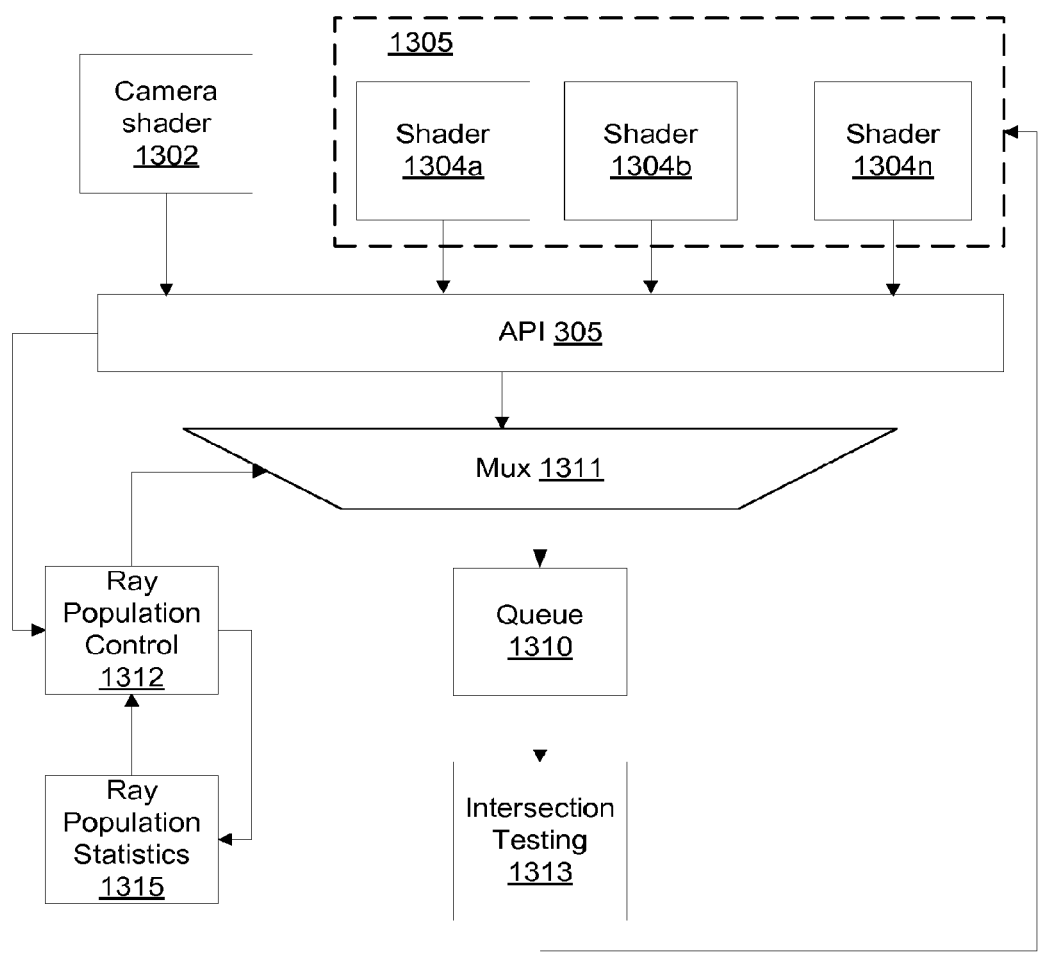
FIG. 13 depicts aspects for an API being used by shaders to emit rays, and subsequent queuing of these emitted rays according to examples described herein.

FIG. 13 illustrates a system diagram implementing another approach to ray population control. FIG. 13 depicts a camera shader 1302 and various shaders 1304a-1304n interfacing with API 305 to emit new rays for intersection testing (e.g., through the emitray and emitraybundle calls depicted in FIG. 3). An output of the API is connected with a mux 1311. The mux 1311 is controlled by a ray population controller 1312 that receives information through API 305 about the nature of the rays being emitted through API 305 to mux 1311. Ray population control 1312 maintains or accesses ray population statistics 1315. Based on the ray population statistics (and optionally, memory statistics), ray population control 1312 selects an order of rays (or ray identifiers) to be stored in queue 1310. Queue 1310 controls in what order the new rays will be tested in intersection testing resource 1313. The intersection testing resource in turn produces indications that are associated with primitives, and cause more shaders to run, emitting new rays. By selecting new rays from shaders that are less likely to cause further new ray emissions, ray population can be controlled. The approach of FIG. 13 also can be implemented in conjunction with other approaches, such that these approaches are not disjunctive. Similar to other approaches described, this approach also can implement either mild or more stringent ray population control, depending on ray population and/or memory usage statistics.

The above description generally disclosed approaches that could in most cases implement a ray-by-ray-shading decision. However, other approaches can be provided instead of or in conjunction with a ray-by-ray shading decision approach.

Figure 10:
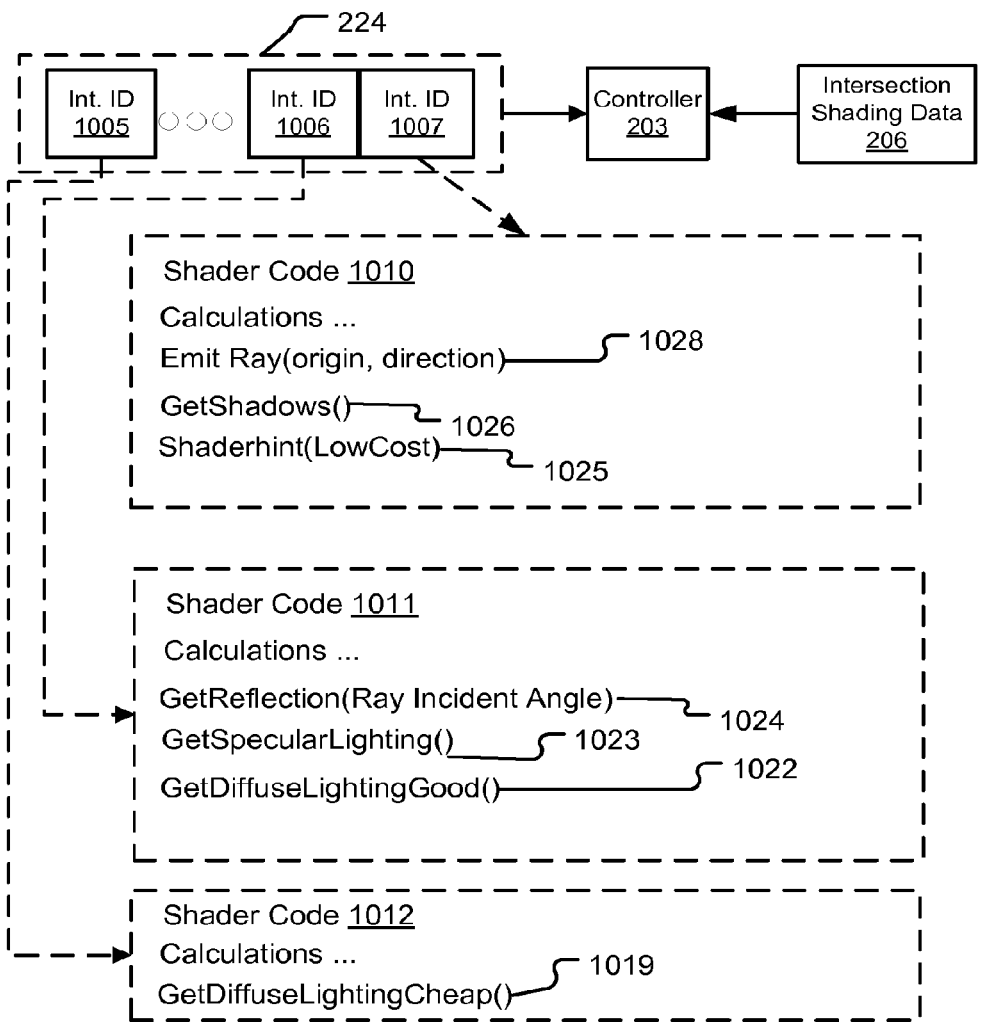
FIG. 10 depicts aspects of mapping shaders to identified ray/primitive intersections, and examples of constituent code that may compose such shaders.

FIG. 10 illustrates an approach where contents of shaders can be analyzed or speculatively executed, in order to determine shader behavior for the purposes of determining whether that shader should be executed and its rays emitted for storage and intersection testing. Link 224 comprising a plurality of intersection indications 1005-1007 are read by controller 203, which receives or accesses data concerning intersection shading 206, and which can include memory usage statistics and the like. Controller 203 maps each of the intersection indications to shader code, respectively 1010, 1011, and 1012. In this example, shader 1010 comprises an emit ray call 1028, a getshadows( ) call 1026 and a shaderhint 1025. Shader 1011 comprises a getreflection 1024 call, a getDiffuseLightingGood( ) call 1022, while shader 1012 includes a getDiffuseLightingCheap( ) call 1019. In one aspect, the shaderhint call of shader 1010 can be used to interpret that the shader 1010 does not emit a large number of new rays. This hint can be used to determine that the shader should be allowed to run. In some cases, hints that can be provided by shaders express or can be interpreted to express a maximum number of rays that are allowed to be emitted during shading of an intersection of that ray. In other words, a shader can emit a ray, with a maximum ray number hint, an intersection for that ray is identified, and during shading of that new identified intersection, the maximum ray number hint can be used to determine whether shading should be deferred.

In another example, the nature of the calls can be analyzed. For example, shader 1011 includes getDiffuseLightingGood( ) call 1022, while shader 1012 includes a cheap diffuse lighting call 1019. Thus, a compiler can generate a hint that shader 1012 would be cheap or relatively cheaper in terms of new ray emissions. This determination also can be made at run time.

A still further variation is that each shader can be allowed to run in a sandbox, and its ray emissions counted or otherwise analyzed to determine whether that shader's behavior is appropriate to allow execution at that point, given memory usage information, and the like.

Figures 11, 12:
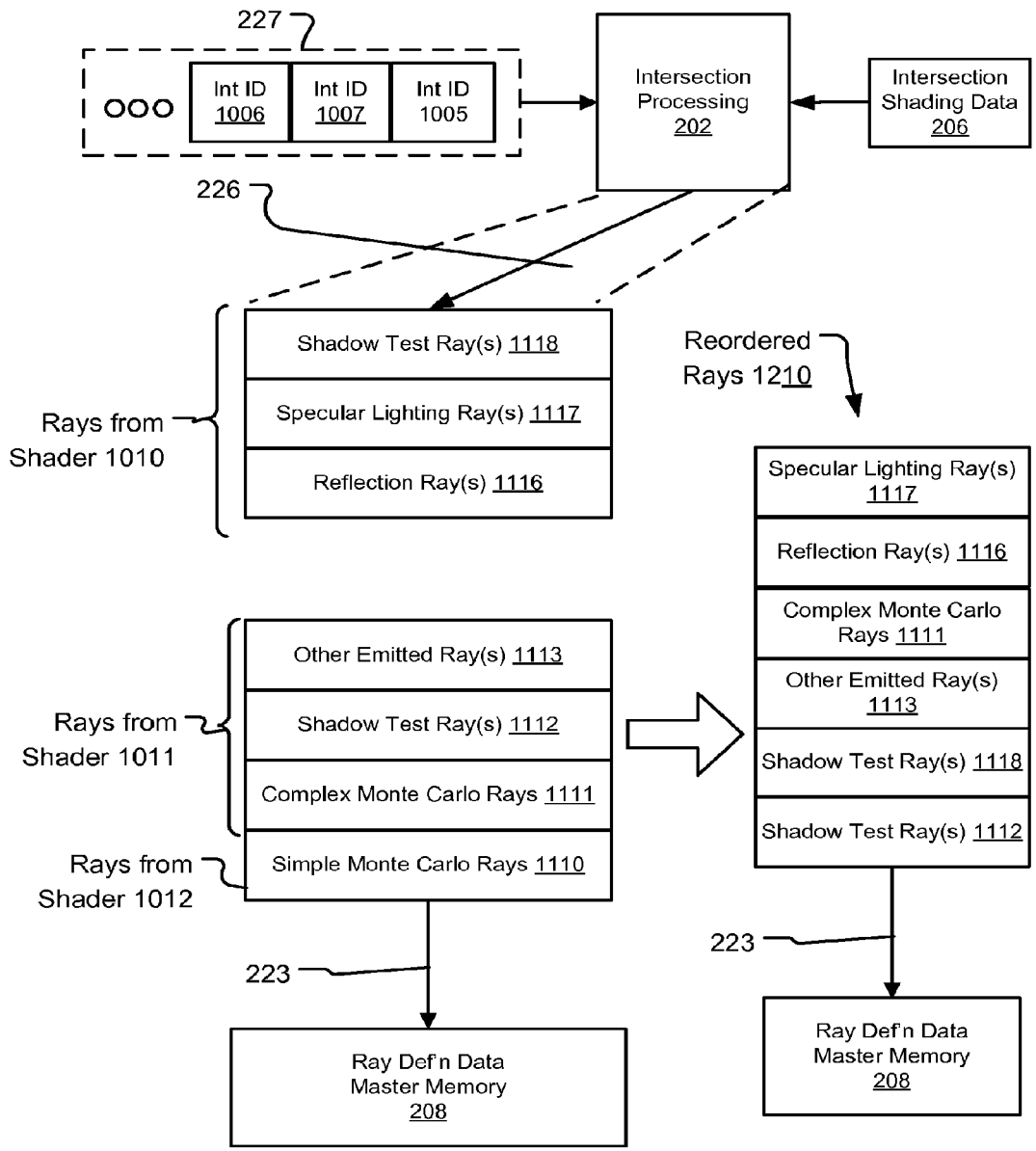
FIG. 11 depicts output of new rays to be intersection tested based on the shaders depicted in FIG. 10.
FIG. 12 depicts reordering of rays depicted in FIG. 11 based on ray population control goals.

FIG. 11 depicts further aspects that can be implemented based on the architecture of FIG. 10. A number of intersection indications are available from queue/link 227, and are shaded by intersection processing 202, with intersection shading data 206. Outputs, though link 226, include the rays depicted. For example, complex Monte Carlo rays 1111 are due to the getDiffuseLightingGood call 1022, while the simple Monte Carlo rays 1110 are due to the getDiffuseLightingCheap( ) call 1019. Link 223 is shown leading to ray data master memory 208.

FIG. 12 illustrates that these rays can be reordered into an order that is more appropriate for causing fewer rays to be emitted subsequently. For example, specular lighting rays and reflection rays can be submitted for intersection testing after shadow test rays and Monte Carlo rays, which may be less likely to cause execution of shaders that will emit a large number of rays themselves.

In sum, one common attribute of the above examples is modulating a number of rays that are emitted to be stored for intersection testing in a scene being rendered. In some examples, the modulation is implemented by a relatively direct control over such control by deferring shading of intersections for rays that are likely to immediately issue a large number of new rays. In other examples, higher order effects can be used for ray population control. For example, amongst a number of shaders that have emitted new rays, those rays that are less likely to invoke shaders that emit a large number of new rays can be prioritized for intersection. For example, although a mirror shader may only issue a few rays, those rays ultimately may hit a primitive whose shader would emit a large number of rays. By contrast, a large number of shadow or diffuse lighting rays, although large in number, are not likely to cause invocation of shaders that would emit large numbers of rays during shading of intersections involving those rays.

FIG. 13 depicts an example system wherein a plurality of shaders 1304a-1304n, and camera shader 1302 can execute on a computing resource or resources 1305. Each shader can be composed of one or more instruction code modes and can access or contain data to be used by the instructions. One action that the shaders can perform, as explained above, is issuing further rays to be intersection tested in the scene, for a variety of reasons. The shaders can emit the rays using an API semantic (305), or otherwise by using a procedural call that can be interpreted by code, to cause the ray to be intersection tested, and results returned. In one example, these API calls for emitting new rays can feed an input to a multiplexer (a multiplexer in the sense that a number of shaders can be emitting rays, and these rays may be aggregated for intersecting testing, such as in a queue 1310.

The multiplexer 1311 can be controlled by a ray population control module 1312, as to which of the emitted shaders rays should be selected next for queue placement. The ray population control module 1312 can make such determinations based on ray population statistics 1315 that ray population control 1312 can maintain. Any of a variety of such statistics can be maintained, including a running average of weights associated with emitted rays, memory usage statistics, such as an available amount of memory, rates of change in such variables, acceleration in rates of change of such variables. Ray population control 1312 also can maintain a target ray population, and determinations as to ordering of placement of rays in queue 1310 can seek to track an actual ray population towards that target ray population. It would be expected that deviations between the target and actual ray population normally would occur, and seeking to track such a target comprehends such variations. In one example, rays can be associated with weighting factors, and ray population control can use such weighting factors in determining a queue order.

Figure 14:
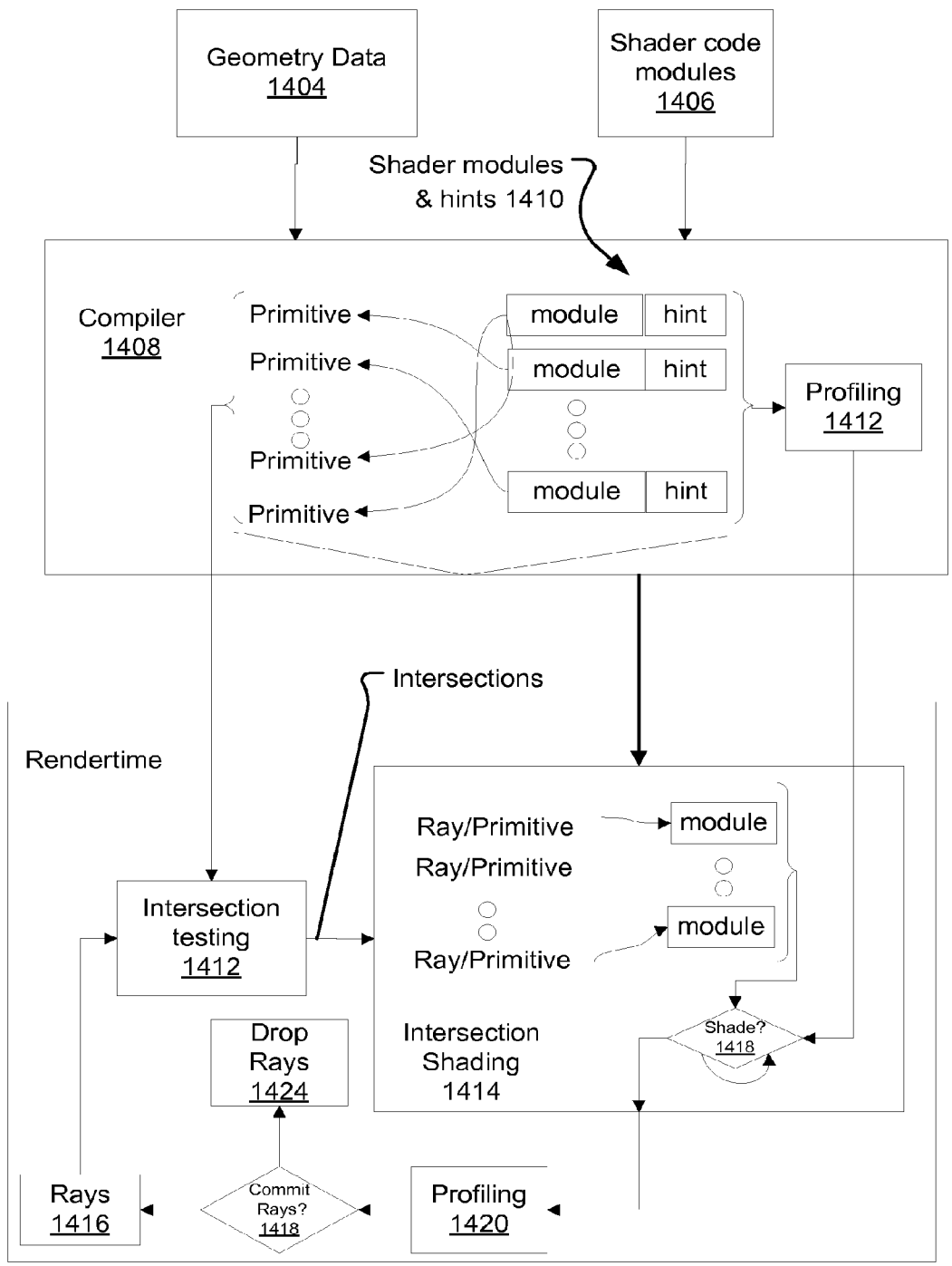
FIG. 14 depicts aspects of a compile time/run time rendering view, in which various examples of shader profiling, hinting, and scratch execution can be provided.

In one usage, the weighting factors are correlated to how many rays likely would be spawned during shading of an intersection involving that ray. An actual number that are spawned can also depend on what primitive was intersected by the ray (or more particularly, a shader associated with that primitive). Therefore, in situations where a comparison between a target ray population metric indicates a ray data surplus (e.g., by numbers of rays or by a total amount of ray data in the system, and so on), rays whose weights indicate a likelihood of production of fewer new rays would be prioritized for intersection testing. As disclosed above, other comparisons can be used to detect such a condition, or that such a condition may be present in the future, and it therefore it is desired to take action now (e.g., reducing a growth rate of ray data, even as a total amount of ray data grows). Outputs of intersection testing 1313 can result in more intersections to be shaded, which in turn can FIG. 14 depicts a further example in which various further aspects and approaches to ray population control are disclosed. In FIG. 14, geometry data 1404 and shader code modules 1406 are provided to a compiler 1408, which prepares a scene to be rendered. One function of compiler 1408 is to bind or otherwise associate primitives of geometry data 1404 to shader code modules, each of which are depicted as being associated with a respective hint concerning that shader's behavior in issuing new rays in run time. A profiling function 1412 uses these hints in producing data that can be used to direct render time behavior. At render time, the scene primitives are provided for intersection 1412 with rays of various sorts (typically starting with camera rays, then rays spawned by such testing, and so on). Indications of such intersections are provided to intersecting shading 1414, wherein shader modules for those intersections can be identified. A decision as to which of these shaders to run can then be made on data derived from the hints, as processed by profiling 1412. For example, if such hinting information indicates that a particular shader may issue a comparatively large number of rays when shaded, then that shader can be deferred in favor of executing another shader, if there is information indicating a surplus of ray data (or rays). If there is no indication of a constraint in memory rays, a ray surplus or other equivalent indication, as implemented in particular embodiments, then shaders can be executed without analysis of hinting information.

Additional or different population control functionality can be implemented as well. For example, after the shader has been executed, profiling 1420 of the rays that were emitted can occur. For example, a number of rays emitted by that shader can be counted. If weighting factors are associated with the rays, statistics concerning those weighting factors can be collected. Such statistics can be pertinent for estimating future effects of running the shader. For example, if only a few highly weighted rays are emitted, then that shader may be immediately cheap, but if each of those rays spawn a large number of rays when they are shaded, then that may be a relevant consideration to be used in some implementations.

In some examples, the original execution of a shader can be done in a scratch memory area that can absorb a large number of rays, or if there is a limit as to a number of rays that can be emitted by any given shader, then the scratch area can be implemented based on that largest expected number of rays. Then, after profiling 1420, it can be determined (1418) whether those rays are to be finally committed for intersection testing, or whether they should be discarded. For example, in a constrained memory condition, the rays can be discarded if they ultimately end up being larger than expected, or larger than what can be absorbed within desired operating conditions (e.g., keeping memory utilization under a threshold).

Profiling 1420 also can result in data that is fed back to be used in an original shading decision. For example, hint information can be used at first, and when actual execution information is available, that actual execution information can substitute for or supplement the hint information. The execution information can be according to various branches in shader code, such that the hint information can be used for not-yet-taken branches in a particular shader, if there are any, while branches that have been taken, actual profiled ray emission data can be used in shade/no shade decisions.

In implementations of many of the disclosed aspects, there often is a comparison between information associated with one ray and information associated with a group of rays, where that comparison is for making probabilistic determination as to behavior of a shader for the ray. The concept can thus be described in relative terms, such that a ray when shaded may be more likely than another ray, or a typical ray, to cause more ray emission. The usage of such relative comparisons would be understandable by those of ordinary skill to be interpretable based on the context, and implementable based on particulars of a situation.

Information gathered by profiling can be stored or otherwise maintained for usage throughout rendering, within a single frame rendering, within rendering of a sequence of frames, or throughout usage of that shader module. Such profiling information can be of predictive as to how many rays may be issued by that shader during execution, even though it may not be absolutely deterministic. In particular, shaders may issue a different number of rays based in part on what kind of ray hit a primitive associated with that shader. Therefore, what happens with a particular shader during rendering of a scene usually would depend both on the shader module and what happens during rendering of a given scene. Nevertheless, predictive value of such profiling data remains. In still further examples, the profiling data can be increasingly specific, and can include data about what kind of ray provoked a particular behavior of that shader. For example, the same shader can be associated with a number of primitives, and that shader can be run in response to a number of detected ray/primitive intersections. Thus, profiling can include maintaining information about what kind of ray (e.g., shadow, diffuse lighting, and so on) provoked a particular behavior. Other information considered helpful or predictive of shader behavior also can be profiled, stored or otherwise maintained during rendering. For example, histograms of rays that were emitted by the shaders can be maintained, they can be associated with weighting factors, and in some cases, they can also be associated with particular branches within code of a particular shading module. Between frames of a sequence, the same shader again may be used, such that the profiled information can continue to be of use in predicting behavior of that shader in rendering subsequent frame sequences.

As would be understood from these disclosures, a variety of attributes, data and other information can be used in estimating, predicting, quantifying or otherwise probabilistically determining shader behavior. However, it often will be the case that precise determinations of shader behavior will not be available. Therefore, decisions made to dynamically control ray population often are heuristic to some degree. As explained above, the heuristic can include gathering data about system resource usage or availability of system resources, data about what rays have been shaded, statistics about such information and so on.

Decisions about whether or not to allow a particular ray intersection to be shaded at a given time then can be based on comparisons between ray intersections available for shading at that time or based on a window of such available intersections. Decisions also can be made based on statistical information, and using that information in comparisons involving particular intersections. Thus, each ultimate decision to shade an intersection at a given point in rendering can involve comparative and/or qualitative determinations, such as whether a shader would emit comparatively more or fewer rays than another shader. Similarly, determinations as to resource usage can be qualitative and need not be precisely numerical. From the disclosed variety of examples and other information, a person of ordinary skill would be able to understand how these terms should be applied or understood in a particular circumstance, based on the various considerations disclosed and other considerations that can be understood from these exemplary disclosures.

By way of further summary, systems according to these examples can more broadly operate to allocate resources between driving intersection testing into further areas of a scene structure, and to produce a wider variety of rays and to starting new camera rays. Ultimately, it is expected to test all rays emitted by the shaders that execute, but an order of execution can have important effects on memory usage during rendering.

Any of the functions, features, and other logic described herein can be implemented with a variety of computing resources. Examples of computing resource(s) include a thread, a core, a processor, a group of processors, a virtual machine, a fixed function processing element, and the like. Thus, various approaches, aspects of methods, processing components, and the like were described, and such computing resources can provide means for implementing these functions. Also, other functions that may be used in implementing embodiments can be provided or implemented as a process, thread or task that can be localized to one computing resource or distributed among a plurality of computing resources (e.g., a plurality of threads distributed among a plurality of physical compute resources).

By particular example, computing resources being used for intersection test can also host other processes, such as shading processes that are used to shade intersections detected. By further example, if a core can support multiple threads, then a thread can be dedicated to shading while another thread can be dedicated to intersection processing.

As discussed above, the described examples can be used in transforming a 3-D scene into a 2-D representation of it, as viewed from a defined vantage point. The 3-D scene can include data representations of physical objects. Other results of ray intersection testing can include object visibility determinations, which can be used in a variety of applications. Other transformations include transforming computer readable media into a different state by storing data determined according to the defined methods.

Figure 15:
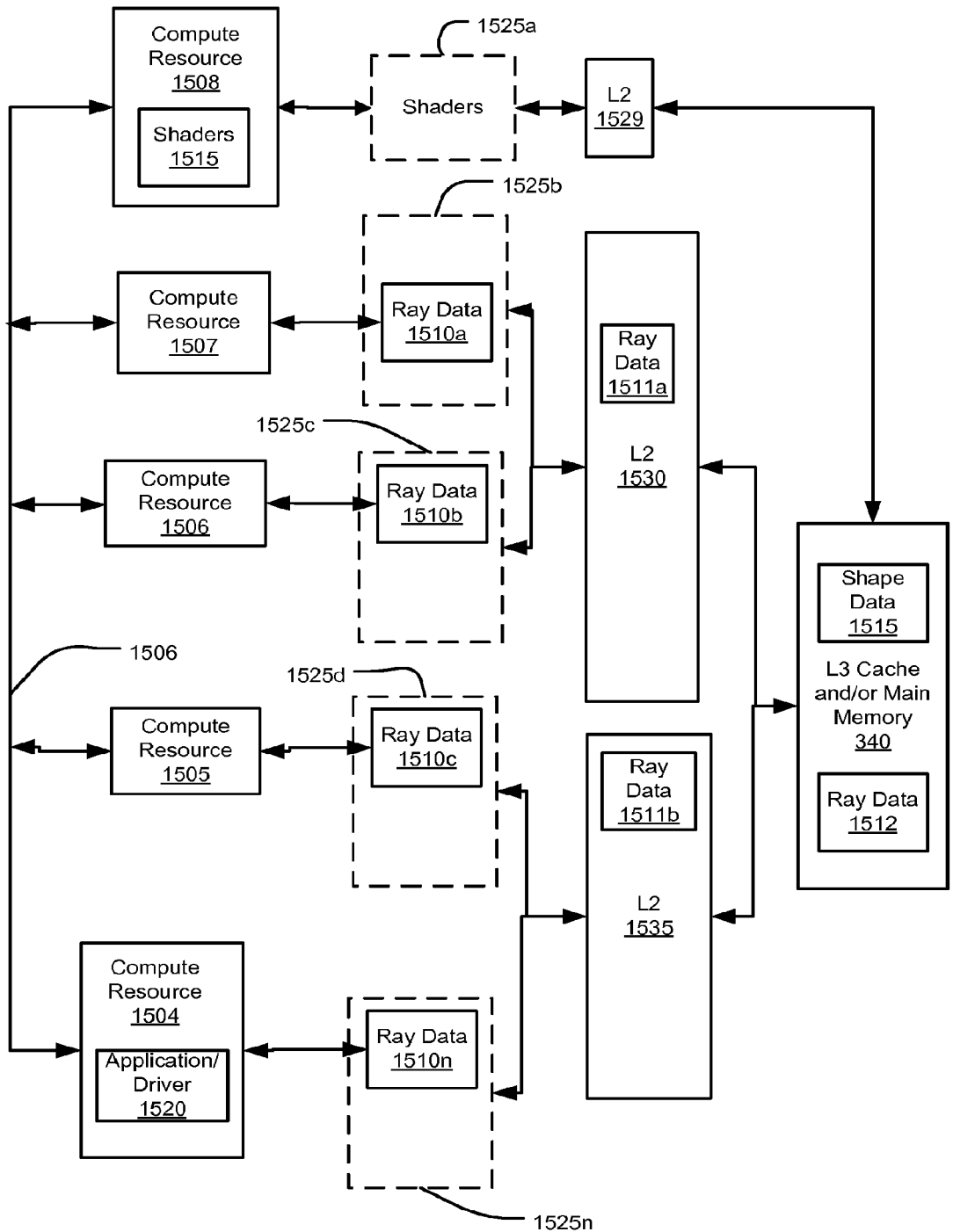
FIG. 15 depicts aspects of an example system in which the various method and system aspects described herein can be implemented.

Turning now to FIG. 15, the above workflow and method examples in preparation for rendering and the rendering itself can be performed in a system 1500 that may comprise a plurality of computing resources 1504-1507. Computing resources 1504-1507 may comprise any one or more of a plurality of processing cores, processors, that can each comprise fixed function and/or programmable elements. The computing resources 1504-1507 may also comprise different threads of computation on a multi-threaded processor, for example. Each of computing resource 1504-1507 may have read and write access to a respective L1 cache 1525a-1525n, that can be integrated with its computation resource or separate. A plurality of L2 caches, e.g., L2 cache 1530 and L2 cache 1535, can be provided and can be shared among the computation resources or private. A shared L3 cache and/or a main working memory 1540 can be provided. In this example, ray data 1510 and shape data 1515 can be stored in L3/main memory 1540. The example system 1500 can execute one or more applications and the scene builder workflow, e.g., application/builder 865. The computation resources can communicate with each other over a shared bus 1501, or using point to point connections, or through shared memory space in the L2 caches 1530 and 1535 or L3/main memory 1540.

In various examples herein, queues were described as being provided between different components. A queue can be implemented logically using a shared memory resource, can be implemented as a first in first out queue, can allow random access, can be implemented as a ring buffer, can be implemented as a dedicated memory or section of memory, can be implemented as a linked list, or by another means as deemed appropriate in the implementation.

As is evident from system 1500, ray data can be stored in a plurality of logically or physically distinct memories. These memories can have different capacities, latencies, bandwidth, and so on. Therefore, in these examples, it would be understood that information relating to memory usage, targets for memory usage, targets for ray population and so on can be expressed to account for characteristics of such systems. For example, a ray population target can be a soft target that allows paging out of rays to a slower, or higher latency memory, and ray population targets need not be a hard target.

Some examples herein were described in terms of memory utilization measures, or goals, while other examples involved ray population targets. It is to be understood that the breadth of these examples show that a variety of implementations can be provided in accordance with these disclosures that provide information useful in dynamic ray population control. For example, measures can be based on a total amount of data for rays being maintained. Such a measure can be useful if some rays have more information for them than other rays.

FIG. 16 depicts further aspects of an implementation of an intersection tester (e.g., intersection testing 210). A number of intersection testers 1605a-1605n can be provided. Each of the testers can interface with a respective buffer 1621a-1621n. The buffers can contain ray identifiers and information about objects to be intersection tested with rays identified by the ray identifiers. The ray identifiers can be provided from a ready packet list 1612 that is controlled (via control 1631) from a packet unit 1608. Ready packet list 1612 can contain a list of ray identifiers to be tested for intersection against one or more shapes identified in the packet (either by reference or by included data). Abstraction point 1620 receives such a packet from ready packet list 1612 and splits the ray identifiers among the buffers 1621a-1621n based on which local memories 231a-231n contain definition data for each of the identified rays. In some implementations, abstraction point 1620 can split the data based on correlating ray identifiers with memory address locations in local memories 1631a-1631n, such as by masking certain bits of each ray identifier in order to identify the intersection tester with ray definition data for that particular ray (of course, more than one local memory may store data for a given ray). Packets can reference elements of acceleration data or primitives to be intersection tested, and typically, rays are referenced first in packets to test against acceleration elements, and ultimately, primitives are identified to be tested.

Packet unit 1608 communicates through another abstraction point 1613, using system interface 1616, to receive further rays to be packetized and intersection tested. Packet unit 1608 also can interface with DRAM 1676 in order to schedule memory transactions to deliver shape data to intersection testers based on references included with packets in ready list 1612.

Packet unit 1608 can use collection memory 1606 in maintaining collections of ray identifiers against shapes in the acceleration structure, and in some cases, collection memory 1606 can be subdivided into fixed size locations that can be used to store a given number of ray identifiers. Given that collection memory 1606 can have a known or otherwise discoverable or configurable size, a known number of collections can be accommodated, and referenced. References to each such location can thus be maintained in a free location list 1610. When results are read from results list 1614, packet unit 1608 processes those results into collections associated with each acceleration structure element intersected. Such processing can include retrieving an identifier for each of the acceleration elements from a return packet, or other information provided by one or more of intersection testers 1605a-1605n. In some implementations, intersection testers 1605a-1605n can pass a packet to collect ray intersection results for a given acceleration element amongst themselves, and in other examples, each intersection tester can aggregate test results for a number of acceleration elements and a ray, or for a ray and a number of acceleration elements.

Collection memory 1606 also can be subdivided into storage locations of various sizes. For example, 2, 3 or 4 differently sized collection storage locations can be provided. For example, a large location can store 32, 64 or 128 rays, while comparatively smaller locations can store 24, 16, or 8 rays. A number of rays that can be tested at any given time (or cycle) by intersection testers 1605a-1605n can be equal to, smaller than or greater than a number of rays in the largest collection size.

Collection storage locations of different sizes can be assigned to different points in an acceleration structure hierarchy. For example, larger locations (i.e., those capable of storing more ray references) preferably are allocated to portions of the acceleration structure closer to a root node, while smaller collection locations are allocated to nodes closer to leaf nodes.

A number of collection storage locations can be combined into one packet that is into ready packet list 1612, for example. As such, a large collection storage location is not necessarily entirely consumed, even though partially full, waiting for rays to be collected against a comparatively isolated, small, or currently inactive, portion of an acceleration structure. In other implementations, multiple collections of a given size can be combined within collection memory 1606 when a number of ray references stored in each reach a number. In a further implementation, ray references can be copied and combined from multiple locations of a given size into fewer locations of a larger size. Packet unit 1608 can select from such collection locations for one or more collections to evict, form a packet to be tested. In sum, some aspects can provide locations in memory of a certain size, where each can be associated with a different acceleration structure element. Collections can be combined, both for packets in flight, and within the memory. Assignment of packet sizes to points in an acceleration structure can be static or dynamic.

Thus, intersection testing results get propagated through abstraction point 1620 to results list 1614, while rays of other collections identified in ready packet list 1612 are distributed among buffers 1621a-1421n. Each intersection tester 1605a-1605n can be operable to read from its buffer when it is able to test another ray for intersection. In some examples, each entry of each buffer can identify a ray to be tested for intersection with an identified shape. Data for the shape can be provided from a DRAM (e.g., DRAM 1676) or other larger, comparatively slower memory, and the provision of such data can be initiated by packet unit 1608.

In some aspects, in addition to ready packet list 1612, a fast packet list 1641 also can be provided. Fast packet list 1641 can be maintained by packet unit 1608. Fast packet list 1641 also feeds into abstract point 1620, where logic selects packets from both ready packet list 1620 and fast packet list 1641. Abstraction point 1620 can be programmed (configured) to prioritize packets from fast packet list 1641 to be intersection tested. In some examples, so long as a packet is available from packet list 1641, it will be selected prior to selection of a packet from ready packet list 1612. In other examples, a higher percentage of packets are selected from list 1641 than 1612. The percentage can be made to vary based on ray population metrics, in accordance with the disclosure. Packet unit 1608 can populate fast packet list 1641 based on aspects of rays constituting the packet (packets preferably contain references to rays, although for convenience, it can be said that the packet contains rays).

Fast packet list 1641 also can be populated based on other ray characteristics that can be heuristically determined. For example, a collection with rays that have an origin closer to a parent acceleration element shape can be prioritized. For example, rays are collected against an acceleration element they intersected. Once a collection of such rays is selected for test, child elements of the acceleration element will be tested against that collection. The child elements can be prioritized for test based on which elements are closer to origins of the rays. For example, if rays were emitted and were travelling in a direction to hit a wall, bounded by one child element, but other child elements bounded objects behind the wall (and were obscured), then the wall element can be prioritized. This approach establishes a smaller clipping distance for each ray sooner, such that farther portions of a scene can be excluded quicker.

Collections in memory can be prioritized for testing if they are closer to leaf nodes of an acceleration structure, if they have fewer layers of acceleration structure beneath them (e.g., the acceleration structure need not be symmetrical or balanced). Packets also can be prioritized based on an area or volume bounded by the acceleration element to which they are associated.

A hierarchy can be implemented by a list. Such prioritization can be implemented by changing the ordering of the list.

The above examples are techniques that can be employed during intersection testing, but not all techniques need or should be employed for intersecting any given scene. A set of such techniques can be employed, where they are given different weighting factors, positive or negative, to score collections for test, and then select such collections for test based on the score.

In preferred approaches, rays are tested based on their having been found to intersect a common element in an acceleration structure comprising a plurality of such elements. For example, an acceleration structure can be a hierarchy of spheres, a kdtree, axis aligned bounding boxes, and so on. As disclosed previously, rays (preferably, references thereto) are collected after having been found to intersect such a common element until a number of such rays are identified, then those rays are tested as a group. In sum, testing of any particular ray is scheduled based on its presence in such a collection. When a collection of rays is selected for test, the information describing the collection when in flight is termed a packet herein for convenience. Criteria for selecting collections for test can include collection fullness, fullness metrics for ray definition data storage 1631a-1631n, and metrics relating to collection memory 1606. Another metric than can be employed relates to an "ancestral" history of the rays in a collection. A particular example serves to explain the aspect more generally.

Where a homogenous sphere hierarchy (spheres either bound other spheres or are leaf nodes bounding primitives, and they are hierarchically related) is employed, a parent sphere bounds a number of number of child spheres. Rays can be found to intersect the parent sphere and are collected. If many of those rays also intersected the same grand-parent sphere (i.e., a sphere higher in the hierarchy than the parent sphere), then that collection can be prioritized for testing and a packet representing the collection can be included on fast packet list 1641.

More generally, packet unit 1608 can prioritize collections of rays that have sequentially been found to intersect the same acceleration elements. One result of this prioritization is that some rays are driven comparatively quickly depth-first into the acceleration structure, even while other rays are allowed to be traversed more broadly in the acceleration structure. This partial depth-first traversal helps some rays complete traversal and get into shading faster, which can encourage production of secondary rays to allow a wider pool of rays from which new collections can be formed. Also, during constrained memory conditions, such depth-first traversal can be used to remedy memory over-use conditions. Thus, fast packet list 1641 can be populated with packets selected based on ray population or memory capacity considerations as well.

The term packet was used extensively with respect to FIG. 16. Examples of ray packets are further described with respect to FIG. 17.

FIG. 17 depicts an example format of a packet 1705 that can be stored in ready packet list 1612 or fast packet list 1641, and includes one or more sets of components comprising a packet ID, a position, a plurality of ray identifiers and a shape identifier. The shape identifier preferably identifies a shape that was determined to be intersected by each ray of packet 1705, where each identified ray is then to be tested against objects identified as related to the intersected shape (e.g., child nodes in a hierarchy of acceleration data). Packet 1705 can comprise a plurality of these sets of components. Stated differently, a number of collections can be combined into one ray packet for testing (a combined packet need not include a packet ID for each constituent source collection, but such is illustrated in FIG. 17).

For example, if two partially full ray collections have been stored in collection memory for a time (e.g., tracked by an aging timer, iterations, cycles or other approaches to tracking length of presence in memory), then, packet unit 1608 may select both of those ray collections for test and combine them into one packet, and that packet is put on either list 1612 or list 1641.

In some approaches, when it is determined that packet 1705 is to begin intersection testing, a separate packet can be formed for each object identified based on the identified shape, and each such packet can be provided to each of buffers 1621a-1621n (e.g., a packet can be formed for each child acceleration element, where that child acceleration element is referenced or definition data for it included in that packet).

In other examples, data defining the objects to be tested can be provided to intersection testers 1605a-1605n, each of those objects can be identified as needing to be tested by the identified provided in the packet (e.g., a number of bits of the identifiers can remain the same, such that so long as a certain number of the bits match, such as the most significant bits, then a given object can be identified as a child of another object).

It was described with respect to FIG. 16 that packet unit 1608, or another entity managing collection data can initiate provision of shape data to testers, when it is determined to test an identified group of rays with such shapes. FIG. 18 depicts an example composition of intersection testers 1605a-1605n in which a working memory 1810 can operate to receive and store such shape data. Working memory 1810 can cache such shape data for repeated tests with different rays, such as when a given packet identified two or more rays that were stored as ray definition data in memory for one tester.

The storage of such shape data can be used in implementing further aspects relating to using ray identifiers for triggering ray testing amongst dispersed intersection testers, as described below.

FIG. 18 illustrates an example of a test cell 1805a, which may contain a working memory 1810 and test logic 1820. Working memory 1810 may be several registers, which contain information sufficient to test a line segment for intersection with a surface, or may be more complicated in other implementations. For example, working memory 1810 may store instructions for configuring test logic 1820 to test a particular shape received for intersection and may detect what shape was received based on the data received. Working memory 1810 also may cache detected hits, where each test cell is configured for testing a series of rays against geometric shapes, or vice versa; then, the cached hits may be output as a group, as further described below. Working memory may also receive incoming shape data from storage, e.g., main memory (205), and store it for usage.

Computer code and associated data can be provided for implementing methods and other aspects described herein. The computer code can comprise computer executable instructions that may be, for example, binaries, intermediate format instructions such as assembly language, firmware, or source code. The code may configure or otherwise cause to be configured a general purpose computer, a special purpose computer, or a special purpose processing device to perform a certain function or group of functions.

Any such code can be stored in computer readable media, such as solid-state drives, hard drives, CD-ROMs and other optical storage means, transiently in volatile memories, such as DRAM, or less transiently in SRAM.

A variety of implementations can be provided which can include interoperative hardware, firmware and/or software that can also be embodied in any of a variety of form factors and devices, including laptops, smart phones, small form factor personal computers, personal digital assistants, and so on. Functionality described herein also can be embodied in peripherals or add-in cards. Such functionality also can be implemented on a circuit board among different chips or different processes executing in a single device, by way of further example.

For example, machines for according to these examples can comprise intersection testing resources including particular fixed-purpose testing cells, and/or general purpose computers configured with computer readable instructions from a computer readable medium to perform the particular intersection tests described and interpret the results of the tests. Further machine components include communication links for providing the acceleration structures to the testing resources and to receive the results of the testing. The machines for intersection testing can be a component of a larger system including other input and output devices, such as a drive for reading scene description data, and a display or a computer readable medium for outputting rendered scenes. For example, the computer readable medium can be a DVD and each scene may be a frame of a motion picture.

In all of the above examples, the 3-D scene being rendered can represent an abstraction or a model of a real-world scene and the rays being tested also can represent light energy being emitted from lights located in the scene. Similarly, the usage of the camera also can represent a vantage point of an observer for the scene. The output of intersection testing results in determining how light affects the scene and ultimately affects output that can be consumed by other applications, can be stored in computer readable media, and can be displayed to a user.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than, additional to, or less than, those identified herein. Rather, the described features and steps are disclosed as examples of components of systems and methods within the scope of the appended claims.

The invention claimed is:

1. Intersection testing apparatus for use in ray tracing, the intersection testing apparatus comprising:
    a plurality of intersection testing processing units;
    a collection memory configured to store collections of ray identifiers, wherein the collections are associated with elements of geometry;
    a packet unit configured to form packets of ray identifiers to be intersection tested against one or more elements of geometry identified in the packet, wherein the ray identifiers of each of one or more of the packets are determined by combining collections, which are stored in the collection memory; and a distributor configured to receive a packet and distribute the ray identifiers from the received packet among the intersection testing processing units;

wherein the intersection testing processing units are configured to receive ray identifiers and to perform intersection testing of identified rays against one or more elements of geometry identified in the packet.

2. The intersection testing apparatus of claim 1 wherein each of the intersection testing processing units is associated with a respective local memory, and wherein the distributor is configured to distribute the ray identifiers among the intersection testing processing units based on which local memories contain definition data for each of the identified rays.

3. The intersection testing apparatus of claim 1 wherein each of the intersection testing processing units is associated with a buffer, and wherein the distributor is configured to place ray identifiers in the respective buffer for an intersection testing processing unit, wherein the intersection testing processing units receive the ray identifiers from their respective buffers.

4. The intersection testing apparatus of claim 1 wherein the collection memory is configured to combine particular collections stored therein when a number of ray identifiers stored in each of the particular collections reaches a predetermined number, the combined collection being included in a packet.

5. The intersection testing apparatus of claim 1 wherein the packet unit is configured to combine collections from different packets into a single packet.

6. The intersection testing apparatus of claim 1 wherein each of the collections stored in the collection memory includes a fixed number of ray identifiers.

7. The intersection testing apparatus of claim 1 wherein at least some of the collections stored in the collection memory include different numbers of ray identifiers.

8. The intersection testing apparatus of claim 1 wherein the elements of geometry are primitives.

9. The intersection testing apparatus of claim 1 wherein the elements of geometry are elements of a hierarchical acceleration structure.

10. The intersection testing apparatus of claim 9 wherein the number of ray identifiers included in a collection is based on the level of the hierarchical acceleration structure with which the collection is associated.

11. The intersection testing apparatus of claim 10 wherein the number of ray identifiers included in a collection is larger if the collection is associated with a portion of the acceleration structure which is relatively close to a root node, and wherein the number of ray identifiers included in a collection is smaller if the collection is associated with a portion of the acceleration structure which is relatively close to a leaf node.

12. The intersection testing apparatus of claim 1 wherein the packet unit is configured to place packets that are ready for intersection testing into either a standard packet list or a prioritized packet list, wherein the distributor is configured to receive packets for distribution to the intersection testing processing units from the standard packet list and the prioritized packet list, wherein packets received from the prioritized packet list are prioritized for distribution relative to packets received from the standard packet list.

13. The intersection testing apparatus of claim 12 wherein the distributor is configured to distribute a packet from the prioritized packet list, and not from the standard packet list, if one or more packets exist in the prioritized packet list.

14. The intersection testing apparatus of claim 12 wherein the distributor is configured to select packets from both the standard packet list and the prioritized packet list for distribution to the intersection testing processing units, with a higher percentage of packets selected from the prioritized packet list than from the standard packet list.

15. The intersection testing apparatus of claim 14 wherein the distributor is configured such that the percentage of packets selected from the prioritized packet list is varied based on a population of rays stored in a memory of the intersection testing apparatus.

16. The intersection testing apparatus of claim 14 wherein the packet unit determines whether to add a packet to the standard packet list or the prioritized packet list based on characteristics of rays included in the packet.

17. The intersection testing apparatus of claim 1 wherein a collection in the collection memory is prioritized for intersection testing based on a volume bounded by an acceleration element with which the collection is associated.

18. The intersection testing apparatus of claim 1 wherein a collection in the collection memory is prioritized for intersection testing based on the distance between the origins of the rays in the collection and a parent acceleration element.

19. An intersection testing method for use in ray tracing, the method comprising:
    storing collections of ray identifiers in a collection memory, wherein the collections are associated with elements of geometry;
    forming packets of ray identifiers to be intersection tested against one or more elements of geometry identified in the packet, wherein the ray identifiers of each of one or more of the packets are determined by combining collections, which are stored in the collection memory;
    distributing the ray identifiers from a packet among a plurality of intersection testing processing units; and
    performing intersection testing, at the intersection testing processing units, of identified rays against one or more elements of geometry identified in the packet.

20. A non-transitory computer readable medium having stored thereon processor executable instructions that when executed cause at least one processor to implement an intersection testing method for use in ray tracing, the intersection testing method comprising:
    storing collections of ray identifiers in a collection memory, wherein the collections are associated with elements of geometry;
    forming packets of ray identifiers to be intersection tested against one or more elements of geometry identified in the packet, wherein the ray identifiers of each of one or more of the packets are determined by combining collections, which are stored in the collection memory;
    distributing the ray identifiers from a packet among a plurality of intersection testing processing units; and
    performing intersection testing, at the intersection testing processing units, of identified rays against one or more elements of geometry identified in the packet.

* * * * *